(12) United States Patent
Beals et al.

(10) Patent No.: US 11,899,000 B2
(45) Date of Patent: Feb. 13, 2024

(54) TECHNIQUES FOR DETERMINING EQUILIBRATION AND STABILITY IN SCIENTIFIC INSTRUMENT SYSTEMS

(71) Applicant: WATERS TECHNOLOGIES CORPORATION, Milford, MA (US)

(72) Inventors: Peyton C. Beals, Wrentham, MA (US); Richard W. Andrews, Rehoboth, MA (US); Barry Sunray, Northborough, MA (US); Steven M. Binney, Sharon, MA (US)

(73) Assignee: Waters Technologies Corporation, Milford, MA (US)

( * ) Notice: Subject to any disclaimer, the term of this patent is extended or adjusted under 35 U.S.C. 154(b) by 1306 days.

(21) Appl. No.: 16/011,761

(22) Filed: Jun. 19, 2018

(65) Prior Publication Data

US 2018/0364205 A1    Dec. 20, 2018

Related U.S. Application Data

(60) Provisional application No. 62/521,583, filed on Jun. 19, 2017.

(51) Int. Cl.
*G01N 30/64* (2006.01)
*G01N 30/86* (2006.01)
(Continued)

(52) U.S. Cl.
CPC .......... *G01N 30/64* (2013.01); *G01N 30/34* (2013.01); *G01N 30/8624* (2013.01);
(Continued)

(58) Field of Classification Search
None
See application file for complete search history.

(56) References Cited

U.S. PATENT DOCUMENTS

| 4,674,323 A | 6/1987 | Rulf et al. |
| 2015/0293064 A1 | 10/2015 | Aota et al. |

FOREIGN PATENT DOCUMENTS

| CN | 103370616 A | 10/2013 |
| JP | S57110959 A | 7/1982 |

(Continued)

OTHER PUBLICATIONS

International Search Report and Written Opinion for International Patent Application No. PCT/US2018/038170 dated Dec. 4, 2018.

*Primary Examiner* — Kara M Peo
(74) *Attorney, Agent, or Firm* — Goodwin Procter LLP

(57) ABSTRACT

A method of performing experiments on samples may include receiving criteria defining a starting state for performing an experiment in a system including a scientific instrument; determining whether the starting state is established in the system; and, responsive to the starting state being established, allowing the experiment, that analyzes a sample using the scientific instrument, to proceed. Determining whether the starting state is established may include automated monitoring of at least one parameter for at least one data channel, and determining whether all such parameters simultaneously meet associated conditions of the criteria for specified time periods. The method may include automatically monitoring the system and re-establishing the starting state prior to performing each of one or more subsequent experiments. The method may include automatically monitoring and establishing a second starting state prior to performing each of one or more additional experiments.

15 Claims, 8 Drawing Sheets

(51) Int. Cl.
  *G01N 30/34*  (2006.01)
  *G01N 30/88*  (2006.01)
  *G01N 21/53*  (2006.01)

(52) U.S. Cl.
  CPC ..... *G01N 30/8658* (2013.01); *G01N 30/8662* (2013.01); *G01N 30/8675* (2013.01); *G01N 30/88* (2013.01); *G01N 21/53* (2013.01); *G01N 2030/8804* (2013.01)

(56)  References Cited

FOREIGN PATENT DOCUMENTS

| | | |
|---|---|---|
| JP | H04184167 A | 7/1992 |
| JP | 2000136999 A | 5/2000 |
| JP | 2011099704 A | 5/2011 |
| WO | 2012/058632 A1 | 5/2012 |

TECHNIQUES FOR DETERMINING EQUILIBRATION AND STABILITY IN SCIENTIFIC INSTRUMENT SYSTEMS

CROSS-REFERENCE TO RELATED APPLICATIONS

This application claims priority to U.S. Provisional Patent Application No. 62/521,583, filed Jun. 19, 2017, entitled "Techniques For Determining Equilibration And Stability In Scientific Instrument Systems", which is incorporated herein by reference in its entirety.

TECHNICAL FIELD

This application generally relates to techniques for determining equilibration and stability in a system, such as a system including one or more scientific instruments.

BACKGROUND INFORMATION

Chromatography is a technique for separating compounds held in solution where the compounds will exhibit different affinity for a separation medium in contact with the solution. As the solution flows through such an immobile separation medium, the compounds separate from one another. Common chromatographic separation instruments include liquid chromatography (LC) systems. Such LC systems are known and used for analyzing sample solutions that may include different chemical compounds. LC systems may operate at high pressures such as at 5,000 PSI and greater. A typical LC system includes a pump for pumping a liquid solution, an injector for introducing the sample into the liquid fluid stream, a chromatography column packed with packing material used as the separation medium and tubing for carrying the sample solution and liquid fluid from the injector to the chromatography column. The tubing is then used to further transport the sample solution output from the LC column to one or more detectors for analyzing the sample solution. Each of the one or more detectors may be any suitable detector such as a mass spectrometer, a UV absorbance detector, an evaporative light scattering detector, and the like.

During operation of the LC system, a liquid solvent is pumped into the LC system at high pressure. The injector may be used to inject controlled volumes of a sample, either manually or automatically, into the system where the sample is carried with the liquid solvent in a fluid stream to the packed LC column where the sample may then be separated. Because each of the chemical compounds in the sample solution interacts in a different manner with the LC column packing material, the various chemical compounds flow through the packed LC column at characteristic rates. The different chemical compounds in the sample solution separate from each other as the sample solution flows through the column. The separated chemical compounds as output from the LC column proceed to the detector where they may be further analyzed, for example, to determine physical characteristics (e.g., concentration, mass, molecular weight) of the compounds for purposes of identification and/or quantification.

SUMMARY OF THE INVENTION

In accordance with one aspect of techniques herein is a method of performing experiments on samples. The method includes receiving first criteria defining a first starting state for performing a first experiment in a system including one or more scientific instruments comprising a liquid chromatograph; and performing first processing that determines whether the first starting state is established in the system. The first processing includes performing automated monitoring of at least one parameter for at least one selected data channel; and determining whether the at least one parameter meets specified conditions of the first criteria. The method further includes, responsive to determining the first starting state is established in the system, proceeding with the first experiment that analyzes a first sample using the one or more scientific instruments of the system; and responsive to determining the first starting state is not established in the system, not proceeding with the first experiment and performing said first processing until the first starting state is established in the system, or an amount of elapsed time waiting to establish the first starting state exceeds a maximum amount of time. The method may also include: selecting the at least one selected data channel from a plurality of data channels, said plurality of data channels including at least a first data channel for the liquid chromatograph and a second data channel for another instrument of the system used in the first experiment; selecting, for the at least one selected data channel, the at least one parameter from a plurality of parameters; and specifying conditions denoting when the at least one parameter for the at least one selected data channel is in a state of equilibrium. The other instrument may be a detector coupled to the liquid chromatograph. The detector may be any of: an absorbance detector, an ultraviolet spectroscopic detector, a visible spectroscopic detector, a PDA (photo diode array) detector, an RI (refractive index) detector, an ELS (evaporative light scattering) detector, an MS (mass spectrometry) detector, an FL (fluorescence) detector, and an EC (electro chemical) detector. The at least one parameter for the at least one selected data channel may include any of: a level parameter having an associated condition indicating that an actual value for the at least one selected data channel must meet a specified level target, a slope parameter having an associated condition indicating that slope of the at least one selected data channel must meet a specified slope target, a peak to peak parameter having an associated condition denoting that noise of the at least one selected data channel must meet a specified peak to peak amplitude target, a second derivative parameter having an associated condition indicating that second derivative of the at least one selected data channel must meet a specified second derivative target, and a derived or composite parameter based on a combination of two or more other parameters of a data channel. The first data channel may be any of: column temperature, sample temperature, system pressure, and column preheater or precooling temperature and the at least one selected data channel may include the first data channel. The second data channel may be any of: detector temperature and detector signal. The first criteria may include a plurality of parameters for a plurality of selected data channels, and wherein the first criteria may include conditions indicating that actual values for the plurality of parameters must meet specified targets, said actual values characterizing a current state of the system. The first criteria may include one or more time periods for which the actual values for the plurality of parameters must simultaneously meet specified targets in order to determine the first starting state is established in the system. Each of the one or more time periods may be expressed in units of time or a number of column volumes. The one or more time periods may include a plurality of time periods for the plurality of parameters whereby a different one of the plurality of time periods may be specified for each of the plurality of parameters and may denote an individual stasis time for said each parameter. The first criteria may include one or more conditions defining a state of equilibrium of the system.

The first criteria may include a first set of one or more conditions defining a state of equilibrium of the liquid chromatograph. The one or more scientific instruments may include a detector coupled to the liquid chromatograph, and the first criteria may include a second set of one or more conditions defining any of a state of equilibrium and stability of the detector. The method may include performing second processing that establishes the first starting state for a plurality of samples, wherein, for each of the plurality of samples, an experiment that analyzes said each sample using the one or more scientific instruments is not allowed to proceed until the starting state has been established. The plurality of parameters may include a composite parameter using data from two different selected data channels. The first criteria may be included in a first method and the first method may include performing sample analysis on a first plurality of samples. The method may further include automatically ensuring that the first starting state is established in the system prior to proceeding with analysis of each of the first plurality of samples. A second method may include a second criteria defining a second starting state and the second method may include performing sample analysis for a second plurality of samples. The method may further include automatically ensuring that the second starting state is established in the system prior to proceeding with analysis of each of the second plurality of samples. If the amount of elapsed time waiting to establish the first starting state exceeds a maximum amount of time, an error condition may be determined and one or more responsive actions may be taken.

In accordance with another aspect of techniques herein is a computer readable medium comprising code thereon that, when executed, performs a method for performing experiments on samples. The method includes receiving first criteria defining a first starting state for performing a first experiment in a system including one or more scientific instruments comprising a liquid chromatograph; and performing first processing that determines whether the first starting state is established in the system. The first processing includes: performing automated monitoring of at least one parameter for at least one selected data channel; and determining whether the at least one parameter meets specified conditions of the first criteria. The method includes, responsive to determining the first starting state is established in the system, proceeding with the first experiment that analyzes a first sample using the one or more scientific instruments of the system; and responsive to determining the first starting state is not established in the system, not proceeding with the first experiment and performing said first processing until the first starting state is established in the system, or an amount of elapsed time waiting to establish the first starting state exceeds a maximum amount of time.

In accordance with another aspect of techniques herein is a system comprising: one or more scientific instruments for use in sample analysis and experimentation, the one or more scientific instruments including a liquid chromatograph; one or more processors; and a memory comprising code stored thereon that, when executed by at least a first of the one or more processors, performs a method of sample analysis and experimentation. The method includes receiving first criteria defining a first starting state for performing a first experiment including performing liquid chromatography using the liquid chromatograph; and performing first processing that determines whether the first starting state is established in the system. The first processing includes performing automated monitoring of at least one parameter for at least one selected data channel; and determining whether the at least one parameter meets specified conditions of the first criteria. The method includes, responsive to determining the first starting state is established in the system, proceeding with the first experiment that analyzes a first sample using the one or more scientific instruments of the system; and responsive to determining the first starting state is not established in the system, not proceeding with the first experiment and performing said first processing until the first starting state is established in the system, or an amount of elapsed time waiting to establish the first starting state exceeds a maximum amount of time.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of techniques described herein.

DESCRIPTION

Figure 1:
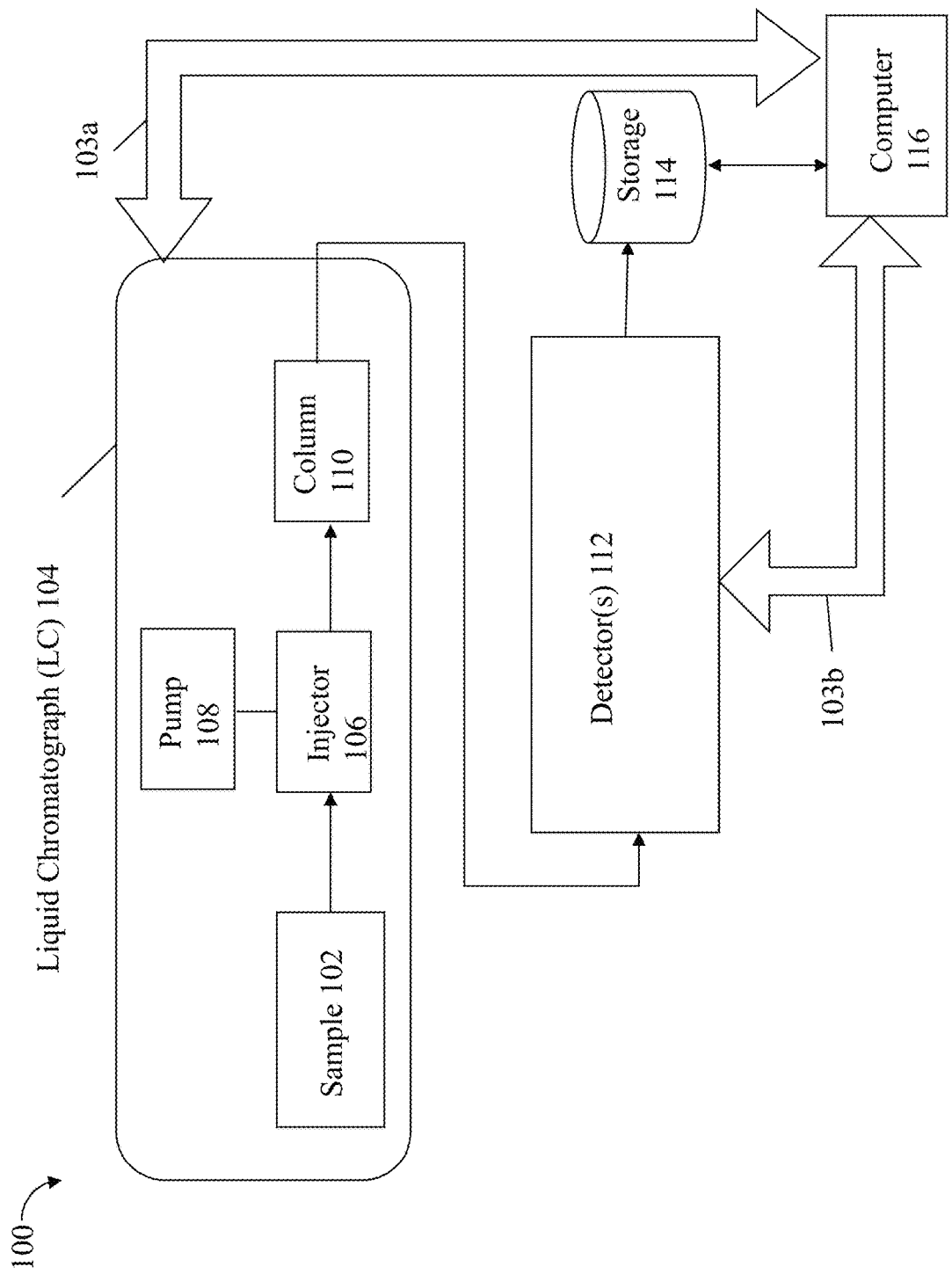
FIG. 1 is an example of a system that may utilize the chromatographic column embodiments described in accordance with techniques herein.

Referring to FIG. 1, shown is an embodiment of a system in accordance with techniques herein. The system 100 may include components such as analytical or scientific instruments for performing sample analysis. In one embodiment, the system 100 may include a liquid chromatograph (LC) instrument 104, one or more detectors 112, storage 114, and computer 116. As will be described in following paragraphs, the system 100 may be used to perform analysis of sample 102 for detecting one or more compounds of interest. The LC 104 may include an injector 106 that receives sample 102, a pump 108, and a column 110. The liquid sample 102 may be introduced for separation by the column 110 of the LC 104. Although not illustrated in FIG. 1 and as known in the art, the LC 104 may also include an optional column compartment surrounding or enclosing the LC column 110 where the compartment is used in connection with heating and/or cooling the compartment and the column therein. The column compartment may be a heater or oven (e.g., that may be used to increase the temperature of column in the compartment to be generally more than ambient temperature). The column compartment may additionally or alternatively provide for cooling (e.g., that may be used to reduce temperature of column to be generally less than ambient temperature). Furthermore, an embodiment of the system 100 may also include an optional component (e.g., column preheater or column precooling unit) placed between 106 and 108 (e.g., prior to the column) used to heat and/or cool the fluid prior to entry into the column 110. In operation, each of the abovementioned column compartment and preheater or precooling unit may have a separate desired set point control that may be specified. Temperatures of each of the foregoing may be measured or observed as described below in more detail in connection with techniques herein in connection with monitoring temperatures of different components as they reach desired new set points. In a similar manner, the component providing the sample 102 may also include heating and/or cooling capabilities to control the temperature of the sample 102 therein.

In at least one embodiment, the computer 116 may be used to control and orchestrate operation of the components, such as the LC 104 and detectors 112. Element 103a generally represents one or more electronic communication connections between the LC 104 and computer 116 where such connections may be used to transmit signals from the computer 116 to the LC 104 to control operation, settings, and the like, of components of the LC 104. For example, the computer 116 may send control signals over connections 103a to control operation of the pump 108, and to control introduction of the sample 102 such as by controlling operation of the injector 106. Additionally, information, such as regarding monitored data channels described elsewhere herein, may be sent over connections 103a to the computer 116 for use with techniques herein. In a similar manner, element 103b generally represents one or more electronic communication connections between the one or more detectors 112 and the computer 116, where such connections may be used to transmit signals from the computer 116 to the LC 104 to control operation, settings, and the like, of the one or more detectors 112. Additionally, information, such as regarding monitored data channels described elsewhere herein, may be sent from the one or more detectors 112 over connections 103b to the computer 116 for use with techniques herein. As known in the art, different components of the system, such as of the LC 104 and detectors 112, may also include embedded hardware and/or software integrated into such components to facilitate communication with the computer 116 for control and operation of the components as well as in connection with reporting or sending information to the computer 116.

In the particular embodiment illustrated in the example 100, the computer 100 may also perform data processing as described herein, for example, of the monitored data channels. In the example embodiment of FIG. 1, a single computer 116 is illustrated as performing processing of data channels monitored as well as related to controlling operation and orchestration of the different components. More generally, element 116 may be characterized as representing use of one or more computer systems to perform all such processing for control and operation of components, data monitoring and evaluation, and the like, as described in more detail elsewhere herein for use with automated techniques herein.

In operation, the sample 102 is injected into the LC 104 via the injector 106. The pump 108 pumps the sample through the column 110 to separate the sample into component parts according to retention time through the column 110. A high pressure stream of chromatographic solvent provided by pump 108 and injector 106 forces sample 102 to migrate through a chromatographic column 110 in the LC 104. Column 110 typically comprises a packed column of porous, non-porous or superficially-porous particles, made of silica, polymer, or an organohybrid silica whose surface may be chemically modified. The output from the column 110 is input to the detector for analysis.

In at least one embodiment, the operations performed in connection with storing the sample 102 and injecting the sample via the injector 106 may be incorporated into a sample manager component of the LC 104; and the operation of the pump 108 providing the solvent may be incorporated into a solvent manager component of the LC 104.

Element 112 may generally denote any one or more suitable detectors that may be coupled for use with the LC 104 in an embodiment in accordance with techniques herein. Such detectors may be used to detect various physical and/or chemical properties regarding the separated sample components (e.g., where such separation has been carried out by the LC column 110). In this manner, the detector 112 may be used in connection with performing data acquisition and analysis (e.g., quantitative and/or qualitative) regarding the experiment performed for the analyzed sample. Although generally any one or more suitable detectors 112 may be used, examples of such detectors that may be used in an embodiment in accordance with techniques herein may include any one or more of: an absorbance detector (e.g., UV (ultraviolet) spectroscopic detector, VIS (visible) spectroscopic detector, PDA (photo diode array detector)), RI (refractive index) detector, ELS (evaporative light scattering) detector, MS (mass spectrometry) detector, FL (fluorescence) detector, EC (electro chemical) detector, and others known in the art.

In at least some embodiments, element 112 may denote multiple detectors which perform multiple types of detections. In such an embodiment, the multiple detector may be arranged whereby the liquid flow path may be serially transferred from one detector to the next in the series. In some cases, the flow path may be split, such as into two resulting paths, whereby each path may lead to a different detector. Additionally, as known in the art, certain detection techniques, e.g. ELS and MS, are destructive to the compounds being tested and may be configured in a serial arrangement only if at the end of the series of detectors.

In one embodiment, the LC instrument 104 may be, for example, a High Performance Liquid Chromatography (HPLC), system such as the Alliance® HPLC system, or an Ultra Performance Liquid Chromatography (UPLC) system such as the ACQUITY UPLC® system from Waters Corporation of Milford Massachusetts A system including an LC instrument such as the foregoing from Waters Corporation may operate under high pressure such as in the range up to 5000 PSI (e.g., exemplary for some HPLC systems) or up to 18000 PSI (exemplary for some UPLC systems).

Consistent with other discussion herein, elements 103a and 103b represent connections over which control signals from computer 116 may be provided to the components of the system 100, such as of 104 and 112. In this manner, an embodiment of the system 100 may be characterized as including computer-controlled instruments 104, 112.

The storage 114 may be any one or more different types of computer storage media and/or devices, where such media or devices may be local to the computer 116 as well as remotely connected to the computer 116, such as using storage provided through a network (e.g., cloud-based storage). As will be appreciated by those skilled in the art, the storage 114 may be any type of computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired code, data, and the like, which can be accessed by a computer processor. As known in the art, data may be stored on storage 114 in any suitable form or format, such as in files, a database, or more generally, any suitable data container such as may be implemented using functionality of the operating system and/or other software.

The computer 116 may be any commercially available or proprietary computer system, processor board, ASIC (application specific integrated circuit), or other component which includes a processor configured to execute code stored on a computer readable medium. The processor, when executing the code, may cause the computer system 116 to perform processing steps such as to access and analyze the data stored on storage 114. Also, as described in more detail elsewhere herein, code executing on the computer system 116 may be used to perform techniques herein for automated monitoring and feedback of the real-time state of the system and its components to determine when desired conditions, such as used in defining a state of equilibrium, have been achieved. The computer system, processor board, and the like, may be more generally referred to as a computing device. The computing device may also include, or otherwise be configured to access, a computer readable medium, such as represented by 114, comprising executable code stored thereon which cause a computer processor to perform processing steps. One or more molecular species migrate through column 110 and each emerges, or elutes, from column 110 and is detected by detector 112. The time that it takes for a molecule to traverse through the column is commonly is referred to as the molecule's retention time. That is, a molecule that elutes from a column at retention time t in reality elutes over a period of time that is essentially centered at time t. The elution profile over the time period is referred to as a chromatographic peak whereby the retention time for the molecule corresponds to the apex of the profile. The elution profile of a typically well-behaved chromatographic peak can be described by a Normal (Gaussian) distribution. In at least some embodiments, the peak may have a width described by its full width at half height, or half-maximum (FWHM). In other embodiments, a peak width may be expressed as relative to a smaller fraction or portion of the peak height.

The retention time and chromatographic peak profile of a molecule eluting from a chromatographic support matrix (e.g., such packing material of column 110 or other separation medium for separating chemical compounds of a sample solution) is a function of the physical and chemical interaction of that molecule between the support matrix and mobile phase. The degree of interaction that a molecule has between the support matrix and the mobile phase dictates the chromatographic profile and retention time for that molecule. In a complex mixture, each molecule is chemically different. As a result, each molecule can have a different affinity for the chromatographic matrix and the mobile phase. Consequently, each can exhibit a unique elution profile.

For effective use of the system 100, a set of conditions or settings (which may be included in criteria used to define the start state or starting state) may be specified denoting the starting conditions that must exist prior to commencing sample analysis. Such conditions simultaneously applied as a set of instrument settings ("setup") may be included in a "method". Such conditions may relate to aspects of the LC 104 and may include, for example, a specific solvent flow rate and initial carrier solvent (the "mobile phase"), composition (relative proportions of aqueous and organic constituents), column temperature, and the like. In addition, the starting conditions of the method as included in the starting state are required to be established prior to commencing experimentation and sample analysis. Such conditions of the starting state may relate to the LC 104 as well as aspects of other components in the system, such as one or more of the detectors 112. For example, in an embodiment including a mass spectrometer as detector 112, the conditions may relate to operation and/or state of a mass spectrometer affecting operation of the MS detector as well as quality of results of the MS detector. For the LC 104, the method may specify conditions including isocratic (i.e., constant) or gradient (i.e., time-varying) solvent composition, depending upon the nature of the sample and the desired result. Starting conditions, however are isocratic (i.e. non-varying). A method may vary solvent flow rate of the LC 104 in addition to, or instead of, composition. Flow rate may not be varied during the separation but may be varied, for example, to ramp up flow before the separation (i.e., as a way to protect the column from pressure spikes).

Because of a variety of chemical, physical and environmental factors, users of these systems understand there to be a minimum amount of time (or cumulative flow volume) required before the system has equilibrated sufficiently to ensure accurate and repeatable results for the desired analysis. Among these factors, a change in column temperature set point can incur a significant lengthening of equilibration time. In addition to the latency associated with the physical heating or cooling of the column chamber, there are complex thermal effects of the mobile and stationary phases within the column itself that must be stabilized in order to achieve a state of equilibrium. Furthermore, there may be a post-analysis column recovery period needed before the next sample may be analyzed. This may be a necessity, for example, for gradient separations. Such post analysis column recovery (e.g., also referred to as recover or recovery elsewhere herein) to be completed prior to commencing the next experimental run or sample analysis may include clearing any highly retained compounds from the column, and then returning the system to initial or starting conditions prior to the start of the next separation.

Thus, the set of conditions, used in connection with defining the starting state of when an experiment or sample analysis commences, may generally include one or more conditions that must be achieved for one or more corresponding parameters or metrics. The one or more conditions may specify values defining when a state of equilibrium has been achieved such as with respect to the LC 104. One or more conditions of the start state, as described above and elsewhere herein, may relate to aspects of the LC 104, such as system or LC pressure, column temperature, sample temperature, pump compression to decompression (C/D) ratio, and the like, as described in more detail elsewhere herein. Additionally, one or more additional conditions of the start state may also relate to other components or instruments of the system, such as one or more of the detectors. For example, the start state may include an additional condition specifying a particular set point temperature of an MS detector 112 to be achieved in an embodiment of the system in accordance with techniques herein. Such one or more additional conditions may relate to aspects of equilibrium, or more generally, stability of other components in the system besides the LC 104. Therefore, generally, the starting state may be defined using criteria expressing when a state of equilibrium and/or stability is achieved with respect to the system 100. For example, in one embodiment, the starting state may define a state of equilibrium with respect to only aspects of the LC 104. As a variation, in at least a second embodiment, the starting state may define a state of equilibrium with respect to aspects of the LC 104 and additionally include one or more conditions denoting equilibrium or stability of at least one other component in the system 100, such as an MS detector coupled to the LC 104. In such a context, conditions of the starting state may be specified for another component which generally denote a degree or state of stability or equilibrium of the other component sufficient for the experiment to proceed. In one aspect, the starting state may be generally characterized as defining when a state of equilibrium has been achieved, such as with respect to the LC 104. More generally, the starting state may define the foregoing state of equilibrium for the LC 104, and may also optionally specify one or more other starting conditions required to be achieved prior to commencing sample analysis, where such one or more other conditions define any of equilibrium and/or stability conditions of one or more other components of the system 100. Thus, in at least some embodiments, the conditions of the starting state (defining when a state of system equilibrium is achieved) may define those conditions of not only a state of equilibrium for the LC 104, but also other conditions regarding stability and/or equilibrium with respect to other components coupled to the LC 104. Such one or more other components may be used in connection with performing sample analysis and/or processing in connection with the experiment whereby such other conditions (of the other components) affect aspects of the experiment, such as quality and/or reproducibility of the experiment, beyond those of the LC 104.

In connection with the LC 104, equilibration is a prerequisite for analysis of the first of a queue of samples ("sample list" or "sample set"), and must be reasserted/re-established for each individual sample thereafter. Analysis of a sample list involves repeating, once for each sample analysis, the pattern of setup-equilibrate-analyze-recover. The amount of time required for each of these steps is defined by an experienced scientist, factoring in various chemical and instrument-specific considerations (e.g., the foregoing amount of time may be documented in a laboratory procedure so that anyone operating an equivalent system can attempt to achieve similar results). Equilibration and recovery times tend to be documented conservatively, i.e. well above a minimum threshold of tolerance to ensure success over a population of systems. In the absence of a documented protocol, existing system not using techniques herein may have different operators with various levels of experience and training where each such operator may be likely to apply personal interpretations and practices when choosing equilibration time. In such instances, different operators may choose different values for equilibration time in the same system thereby possibly affecting reproducibility of experimental conditions.

The measure of adequate equilibration time such as in an LC 104 is partly dependent upon the physical system delay or system dwell volume between the pump and head of the LC column. Equilibration time is also influenced by the chemical and physical equilibrium between the mobile and stationary phases within the column. An embodiment in accordance with techniques herein may express equilibration time (or more generally time to reach or achieve a starting state and associated conditions required prior to commencing an experiment, as well as wait time or latency required for steady state or stasis time as described elsewhere herein) in terms of "column volumes" rather than time. (Consistent with other discussion herein, stasis time is the minimum amount of time that a measured parameter is required to remain on target before being considered "equilibrated"). The "column volume" (also known as void volume) unit of measure is an approximation that depends upon the physical internal volume of the column cylinder, as well as the packing material's particle size and porosity. Column volume, or void volume, is the volume in the column that is occupied by the mobile phase. The column volume may be in units, such as ranging from microliters ($\mu$L) to milliliters (mL), and may be considered a fixed characteristic for a particular column size/dimensions using a particular stationary phase, such as column particles. In at least some embodiments, the equilibration time may be expressed as positive integer number of column volumes. For a particular column volume and a given method's flow rate, the equilibration time may be alternatively expressed in units of time, such as in minutes, and can be easily determined (e.g., by multiplying the number of column volumes, such as 10, by the column volume, such as 2.5 mL, a total amount of 25 mL of mobile phase is required for equilibration. At a flow rate of 1 mL/min, equilibration may be determined to take 25 minutes). The advantage of characterizing LC equilibration time in terms of column volumes is that this measure is largely transferable between different scales of analysis (e.g., provides for normalization). The larger the column, generally the longer it will take to equilibrate. However, for two different columns each having different column dimensions but packed with the same stationary phase, the number of column volumes needed to equilibrate remains the same. Thus, an embodiment in accordance with techniques herein may express time values of the X axis in terms of a unit of time such as minutes as provided in following examples. As an alternative, an embodiment may express time, such as equilibration time, in terms of number of column volumes as a means of normalizing across columns with different void volumes (and thus different column dimensions) and possibly operating at different flow rates. An embodiment may automatically determine a column volume for a particular column using a table, electronic record associated with the particular column and particle characteristics, or other means by which to look up (a predetermined column volume) or automatically calculate a column volume of a particular LC column. As an alternative, the column volume may be calculated based on the internal cylindrical dimensions for a particular column, and column particle characteristics (e.g., stationary phase characteristics such as particle dimensions and spacing within (e.g., how porous) and between the particles). Generally, in following paragraphs, particular examples may be provided using units of time that may be alternatively, and interchangeably, expressed in terms of column volumes.

Described in following paragraphs are techniques that may be used in connection with automating aspects of monitoring the state of the system 100 and determining when the starting state has been reached. Techniques described in following paragraphs provide for automated monitoring, evaluating and determining when a state of equilibrium of the LC, as well as any other conditions of the starting state, have been reached. In at least one embodiment, the starting state, or more specifically the state of LC equilibrium in combination with any additional condition(s) of another system or component such as a detector, may be defined using a parametric definition identifying the one or more conditions of the starting state required to be achieved prior to commencing an experiment for data analysis. An embodiment not using techniques herein may, for example, rely on a manual determination by individual operators as to when the starting state conditions, such as a state of LC equilibrium, have been reached. Further, an embodiment not in accordance with techniques herein may rely on an individual operator waiting a fixed amount of time between experimental runs of samples. In contrast, an embodiment in accordance with techniques herein may automatically determine when LC has reached its required starting state to commence sample analysis using a feedback loop in which current observed values for parameters or metrics describing the current state of the system may be obtained and compared to the specified parametric definition of equilibrium. Such a determination of when a required starting state has been reached may be achieved through automated monitoring and comparison for the first of a series of sample analyses as well as each subsequent sample analysis. In other words, techniques herein may be used to determine when the LC has equilibrated to a desired starting state for a first sample and also when the LC has been subsequently equilibrated to the desired starting state for each subsequent sample analysis.

Using such automated techniques as described herein enhances and ensures reproducibility of experimental conditions and results such as, for example, by removal of manual techniques as may otherwise be performed manually by an operator or programmed manually using fixed time delays. Such manual techniques performed by each individual operator allow for introduction of human error and experimental variation such as may be due to varying or inadequate skill levels (e.g., manual instrument reads for different metrics such as column temperature; each individual operator determining when a sufficient amount of time has elapsed in order to commence the next experiment). Thus, use of techniques herein avoids the foregoing drawbacks of not using techniques herein.

Additionally, use of techniques herein may also result in a time savings (e.g., not using techniques herein, operators individually making a decision regarding whether a sufficient amount of time has elapsed between experiments may therefore wait an excessive amount of time), since automatic parametric equilibration using techniques herein reduces the likelihood of excessive equilibration. With method and equilibration criteria (or more generally criteria of the starting state) codified together and under software control in an embodiment in accordance with techniques herein, procedural risks and/or ambiguities arising from manual procedures are reduced; and reproducibility of results across a population of operators and laboratories is improved.

In an embodiment in accordance with techniques herein, equilibration, or more generally, determining when a specified starting state has been achieved, may be based on automated physical instrument read backs for a defined set of parameters or metrics denoting a current state of the system, initial conditions of a starting state for a parameterized definition of equilibrium, and automated determination such as under software control to determine whether the current state of the system meets the parameterized definition of equilibrium.

In at least one embodiment in accordance with techniques herein, metrics for determining LC equilibration, or more generally starting state of prerequisite or initial conditions for experimental sample analysis, may include, for example, the rate of change of one or more monitored parameters (e.g., slope or drift) and/or the amplitude of parametric noise (variability). For some parameters, initial conditions of the starting state defining equilibrium may include a target value and margin or tolerance (e.g., range within target value). In some embodiments, current values of the parameters may be derived from one or more current or observed measurements regarding the current system. For example, a current value of a parameter of the starting state may be obtained for use in determining whether equilibration is achieved through mathematical filtering of one or more current values obtained for one or more channels, such as taking the second derivative. To achieve a comprehensive assessment of LC equilibration, an embodiment in accordance with techniques herein may use multiple key instrument values for metrics or parameters such as system pressure, column temperature, detector signal, etc., and may obtain such current or observed values simultaneously.

Independent of the analytical method, a manufacturer of scientific instruments or systems such as of FIG. 1 may be able to encode universal equilibration criteria, or more generally, universal starting state criteria, that satisfy a majority of applications conforming to the intended use of such instruments and system. For example, as an indicator of stability, the LC 104, or more generally, system 100 of FIG. 1, may declare itself "equilibrated" when the second derivative of LC pressure (also referred to herein as system pressure) has reversed its numeric sign some minimum number of times following a method change. To further allow for application dependent customization, an embodiment in accordance with techniques herein may also allow for further customization of aspects of criteria of the starting state, such as customization of initial conditions and metrics or parameters, by method developers or users of the system 100. For example, an embodiment in accordance with techniques herein may provide a default definition of LC equilibrium as part of the starting state definition where the LC equilibrium may be defined using equilibrium criterion/criteria including a first parameter of column temperature with a default target value and default tolerance or acceptable range (e.g., target value+/−range defines temperature range). The embodiment may allow customization of the default target value or range (e.g., initial condition) for column temperature. The embodiment may further allow customization by allowing a user to add a second parameter and associated initial conditions for the second parameter. In this case, the state of LC equilibrium, as well as starting state conditions, may be determined as achieved by the LC 104 when both the foregoing first and second parameters achieve their respective specified initial conditions.

Figure 2:
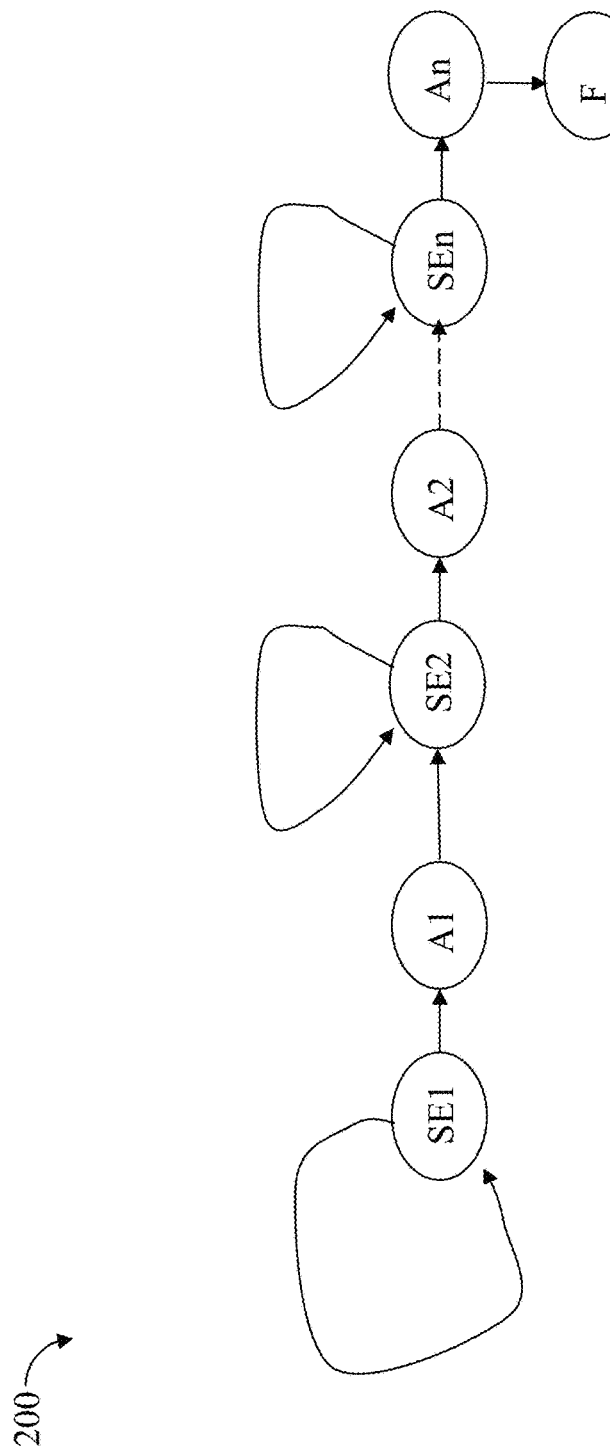
FIG. 2 is an example of a state diagram illustrating different processing states that may be performed in an embodiment in accordance with techniques herein.

Referring to FIG. 2, shown is an example illustrating different states of a system in an embodiment in accordance with techniques herein. The example 200 includes circles each denoting a state of the system. Arrows between states denote transitions from one state to another target state. The example 200 includes states SE1, SE2, SEn, A1, A2, An, and F. Each of the SE states, (e.g., SE1, SE2, SEn) may denote a different or the same starting state of criteria including at least one condition that, when met, defines a state of LC equilibrium and thus when a subsequent experiment to analyze a sample may commence. Each of the A states (e.g., A1, A2, An) denotes processing performed for a sample analysis subsequent to achieving equilibrium represented by an immediately prior SE state. Thus, the example 200 may be characterized as including "n" pairs of states (n being a positive integer of 1 or more), where each pair includes an SE state followed immediately in sequence by a corresponding A state, whereby a transition from the SE state to the corresponding A state occurs once equilibrium of the SE state has been achieved. Once the sample analysis represented by the A state has completed, transition is made to either the final F state or another subsequent SE state. The dashed transition arrow between A2 and SEn generally denotes zero or more additional state pairs where each pair includes an SE state and its corresponding A state, as just described above.

Consider, for example, in more detail the case where SE1 and SE2 each denote different starting states and thus different starting criteria. Thus, SE1 denotes a first starting state, and SE2 denotes a second starting state. For example, an embodiment in accordance with techniques herein may perform a first experiment on a first sample (denoted by state A1) where the first experiment (transition from SE1 to A1) commences once techniques herein have determined a first state of LC equilibrium denoted by SE1. As long as the current system state does not meet conditions of the first LC equilibrium state denoted by SE1, the system state is not allowed to proceed or transition to a different state such as A1 (e.g., remain in state SE1). Once the current system state meets the first starting state conditions denoted by SE1, the experiment is allowed to proceed as indicated by the transition from state SE1 to state A1. Once the first sample analysis and first experiment (denoted by A1) are complete, the system transitions from state A1 to state SE2 to prepare for the second experiment using the second sample. The second experiment on a second sample (denoted by A2) commences once techniques herein have determined that conditions of a second starting state, as denoted by SE2, have been achieved. As long as the current system state does not meet the conditions denoted by SE2, the experiment of the second sample is not allowed to proceed and thus remains in state SE2. Once the current system state meets the second starting state conditions denoted by SE2, the second experiment is allowed to proceed as indicated by the transition from SE2 to state A2. In a similar manner, one or more additional pairs of SE-A states may be included (as denoted by the dashed arrow) whereby equilibration or starting state conditions, as denoted by the SE state of the pair, is achieved prior to allowing transition to the corresponding A state of the pair, where the additional sample analysis or experiment is allowed to proceed. In this example, once the last/final equilibration state SEn and corresponding last/final experiment sample analysis An are complete, the system transitions from An to the ending or final state F.

Thus, techniques herein may be used in connection with automatically monitoring and determining when a current system state has achieved conditions of one or more starting states, as denoted by states SE1, SE2 and SEn. In the particular examples described above, each of the starting states SE1, SE2, SEn, may define one or more conditions for LC equilibrium. Each of SE1, SE2 and SEn may define the same set of one or more conditions, or different conditions, depending on the subsequent sample analysis. Techniques herein may be used to automatically monitor system state and automatically evaluate and determine when the existing system state meets the equilibrium conditions of SE1 at a first point in time prior to commencing a first experiment A1, then also meets conditions of SE2 at a second point in time prior to commencing a second experiment A2. Once conditions of SE1 and SE2 are achieved, the respective experiments A1 and A2 performing sample analysis are allowed to proceed.

Figure 3:
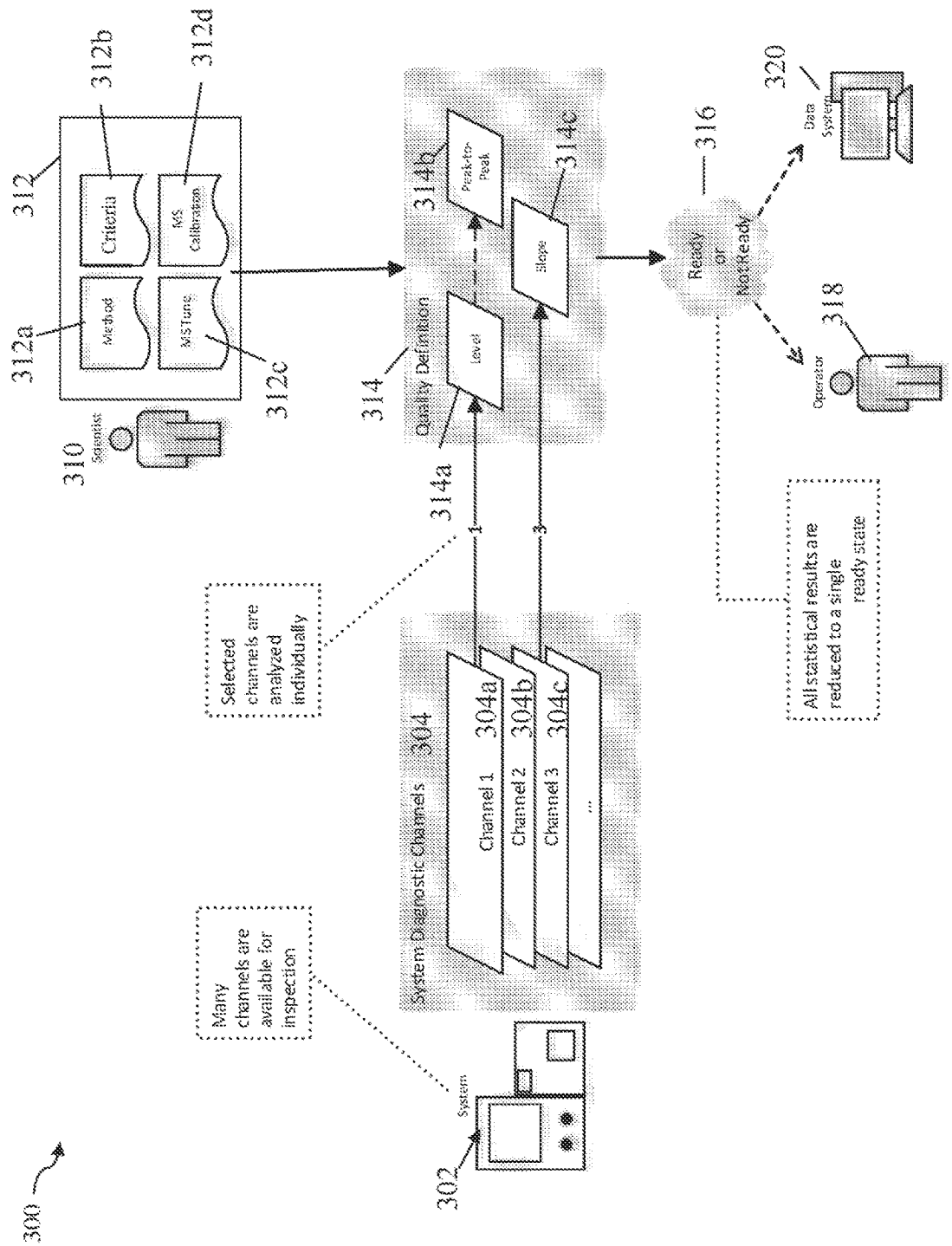
FIG. 3 is an example illustrating components and data flow in an embodiment in accordance with techniques herein.

Referring to FIG. 3, shown is an example 300 illustrating a system and use of techniques in one embodiment. The example 300 includes a system 302, such as an instrument system described in connection with FIG. 1 including an LC and one or more detectors, such as an MS detector. In such an embodiment, multiple diagnostic channels 304 may be available for monitoring in connection with techniques herein. In this example, channels 304$a$-$c$ may be available of which 304$a$ and 304$c$ are monitored for use in connection with determining when the system 302 has achieved conditions of a starting state. Element 314 may generally denote current values for metrics or parameters 314$a$-$c$ obtained for system 302 where such current values 314$a$-$c$ may denote a current state of the system 302 with respect to whether or not the system 302 has achieved specified conditions of the starting state required for commencement of experimentation for samples analysis.

To further illustrate in this example, a first diagnostic channel 304$a$ may be monitored to obtain values for a first current metric or parameter 314$a$ and a second current metric or parameter 314$b$; and a second diagnostic channel 304$c$ may be monitored to obtain a third current metric or parameter 314$c$. The first diagnostic channel 304$a$ may generally denote a value such as of an instrument read of an observed value for the current system 302. Both the first and second metrics or parameters 314$a$-$b$ may be determined based on observed values from the first diagnostic channel 304$a$. For example, the first metric or parameter 314$a$ may be an observed current value of channel 304$a$ compared to a level defined as a specified target value or target numerical range, where the criteria of the starting state for 314$a$ may indicate that the current observed value of the first diagnostic channel 304$a$ needs to be within a specified target range for a specified time interval. The second metric or parameter 314$b$ may be the peak-to-peak variability of channel 304$a$ observed over a specified time interval. The second metric or parameter 314$a$ as the peak-to-peak variability of channel 304$c$ may be produced to include peak-to-peak values for binned groups of raw values of channel 304$a$. The starting state conditions may indicate that the peak-to-peak parameter value 314$b$ be below a specified threshold when observed over the specified time interval. The third metric or parameter 314$c$ may be determined from current values of channel 304$c$. For example, the third metric or parameter 314$a$ may be a slope or first derivative. The slope may be determined, for example, by least-squares or other suitable techniques, with respect to a signal formed from discrete observed current values of channel 304$c$ over a specified time interval (e.g., short time window or for a specified number of raw data points).

The third metric or parameter 314$c$ may be produced using values of the instantaneous slopes for each observed values of channel 304$c$. The starting state conditions may indicate that slope parameter 314$c$ be within a specified target range. In at least one embodiment, the starting state conditions may indicate that the slope parameter 314$c$ be within a specified target threshold amount relative to zero slope over a specified time interval (e.g., that the measured slope parameter 314$c$ be within a threshold amount of a zero slope over the specified time interval). In such an embodiment, techniques herein may automatically determine that conditions of the starting state have been achieved when all of the foregoing conditions for the 3 metrics or parameters 314$a$-$c$ have been achieved.

Element 312 may generally denote different items used in connection with performing sample analysis and conducting and controlling instruments in connection with performing one or more experiments. Element 312 may include method 312a, criteria 312b, as well as other items 312c-d as may be used in connection with tuning and calibrating a detector, such as an MS detector, of the system 302. In one embodiment, a default set of universal criteria meant to generally specify criteria applicable to a large number of applications and systems 302 may be supplied as an initial set of criteria 312b. The initial set of criteria 312b may be further modified or refined (e.g., customized) for a particular application, system or instruments, and the like, that may be used in a particular embodiment. Generally, a skilled user, such as scientist 310, may define and/or refine any one or more items of 312 including the method 312a, criteria 312b, and defined procedures 312c-d for the MS detector of 302.

The criteria 312b may generally include conditions which, when reached, denote that the starting state has been achieved. In one embodiment as described herein, such conditions of criteria 312b may include conditions as noted above for metrics or parameters 314a-c. Such conditions and parameters of criteria 312b may relate to equilibration such as for the LC as included in system 302. Additionally, consistent with discussion herein, such conditions and parameters of criteria 312b may also include one or more other conditions and parameters of other components or instruments (e.g., one or more detectors such as an MS detector) in the system 302. For example, one or more conditions and associated metrics or parameters of the starting state denoted by criteria 312b may relate to an MS detector of system 302.

Such criteria 312b denoting the starting state or initial conditions as to when equilibrium has been achieved may be evaluated 316 in light of current values 314a-c. As denoted by 316, a determination may be made as to whether current observed conditions (e.g., 314a-314c) of the system 302 meet the starting state criteria 312b. Such a determination made in 316 may result, for example in a single Boolean result indicating whether or not system 302 has achieved the state of equilibrium. Element 316 denotes, for example, comparison of the current observed values for 314a and 314c to specified initial conditions denoting a specified starting state criteria of 312b. If 314a-314c meet or achieve the specified starting state criteria as indicated by 312b, a ready indicator may be the result determined by step 316 to the operator 318 and/or data system 320. The data system 320 may be, for example, a computer system including software that controls operation of the instruments in system 302 and schedules samples for processing. Responsive to 316 indicating a ready state denoting system 302 has achieved a desired starting state (as represented by conditions of criteria 312b being achieved), the data system 302 may automatically allow processing for experimentation and analysis of the sample by system 302 to proceed without user intervention. In such a system, processing for experimentation and analysis of the sample by system 302 is also not allowed to proceed if 316 indicates a not ready state denoting system 302 has not achieved a desired starting state represented by conditions of criteria 312b. In at least one embodiment, the sample analysis by system 302 may be allowed or not allowed to proceed in an automated and controlled manner using suitable hardware and/or software to control such processing and sending appropriate control signals to system 320, 302 and the like. In at least one embodiment, if equilibrium is achieved thereby indicating a ready state in 316, the instrument system 302 may receive a ready control signal indicating that is it allowed to proceed with sample analysis (e.g., enable components or otherwise place components in a suitable operating state in order to allow sample analysis to proceed). Otherwise, if equilibrium is not achieved thereby indicating a not ready state in 316, the instrument system 302 may not receive a ready control signal and may be in a state where the instrument system is instructed not to proceed with sample analysis (e.g., disable components or otherwise hold components of the instrument system 302 in a waiting state whereby the instrument system does not allow sample analysis to proceed).

In at least one embodiment of techniques herein, a system (e.g., 302 of FIG. 3 such as illustrated in more detail in FIG. 1), may be delivered to a customer by a manufacturer of the system with the ability to self-evaluate and determine when a starting state for experimentation has been achieved. The starting state may be defined using criteria as generally described herein which may relate to equilibration of an LC, equilibration and/or stability of one or more detectors or components used subsequent to the LC in a system in connection with an experiment, and the like. Furthermore, an expert, such as a scientist or user of the system with proper credentials, level of skill and expertise and privileges, may refine an initial set of criteria denoting the starting state where the initial set of criteria may be supplied, for example, by the system manufacturer. The expert may further customize or refine the initial set of criteria in accordance with known information about the expert's particular system configuration, physical properties of chemicals used during experimentation, the particular methods, and the like, to further ensure reproducibility of experimental conditions and runs and ensure efficient system operation. As described above, the introduction of automation into the process using techniques herein alleviates some of the potential error associated with manual repetition of documented procedures, potentially reduces resource (e.g., solvent and time) consumption, and frees the operator to perform other tasks. Automated parametric read back equilibration also offers the potential benefit of reducing or eliminating the evaluation, verification and validation of an empirically determined approach that is manually documented.

Generally, processing described in connection with FIG. 3, such as for automatically reading criteria 312, monitoring desired data channels 304, determining observed values for parameters 314a-c, performing processing logic represented by 316, communicating ready/not ready result to the operator 318 and data system 320, and the like, may be embodied in hardware and/or software that programmatically performs the desired processing as described herein. Such software and/or hardware performing the foregoing may be embodied in software that runs on a processor, using a customized application-specific integrated circuit (ASIC), and the like. Such software and/or hardware may be embodied in one or more components separate from the instrument system 302 as well as an embodiment where such one or more components and associated functionality may be integrated into the instrument system 302. More generally, the hardware and/or software performing the processing as described in connection with FIG. 3 may be embodied in a separate component, or alternatively integrated with any other suitable components or system, such as the instrument system 302.

In such an embodiment, the starting state denoted by criteria 312b may be varied for different methods as well as for different experimental runs, injections or sample analysis performed within a single method. For example, techniques herein provide for specifying a first starting state defined used one set of criteria used in connection with all runs, injections or samples analyzed in a first method. Techniques herein also provide for specifying a second starting state defined used a second set of criteria used in connection with all runs, injections or samples analyzed in a second method, where the second starting state may use different criteria than the first starting state. Generally, techniques herein provide flexibility that may be used to vary the starting state on a fine level of granularity, such as per method, as well as for ensuring that the same starting state is re-established between different sample analyses of the same method (thereby using the same starting state or set of initial conditions denoting equilibrium). For example, processing performed may include N injections to analyze N samples. In a first scenario, the set of conditions of criteria of the starting state for each of the N injections may be the same whereby techniques herein may provide for automatically evaluating and re-establishing the same starting state prior to performing each of the N injections in sequence. As a second scenario that is a variation of the first scenario, each of the N injections to analyze N samples may require a different set of conditions and starting criteria. Techniques herein may provide for automatically evaluating and establishing each different starting state and associated criteria for each of the N injections prior to performing each of the N injections in sequence.

As described in more detail below, techniques herein may use quantitative physical system parameters (as well as possible chemical physical property constants) and may apply runtime statistical reduction to determine level, slope (e.g. drift), and peak-to-peak (e.g., noise) variability, as well as other mathematical filtering as needed. For a given application and system configuration, any combination of the foregoing may be included in criteria defining a starting state of an experiment. The starting state may specify conditions as to when LC equilibration is achieved, and possibly other conditions denoting when stability and/or equilibrium is achieved for other components and/or instruments used in combination with the LC in a system performing an experiment for sample analysis. Such criteria of the starting state, when achieved, establishes a benchmark of system readiness or system equilibration where the system is deemed ready to proceed with performing an experiment using instruments and components of the system.

The techniques herein use quantitative physical system parameters (as well as possible chemical physical property constants) and apply runtime statistical analysis to determine level (e.g., mean or average value), slope, and peak-to-peak variability, as well as other mathematical filtering as needed. For a given application and system configuration, any combination of these may be included in an equilibration quality specification to establish a benchmark of system readiness.

In at least one embodiment, monitored instrument data from each diagnostic channel (e.g., 304) may be obtained as a two-dimensional stream with time on the horizontal or X axis and data observed from the channel (time dependent data observed) on the vertical or Y axis. The data rate (points per second at which data points over the channel are read or acquired) of the channel may be fixed, and defined by the system.

As described in connection with FIG. 3, a first step in processing in connection with specifying the criteria of the starting state, such as for defining LC equilibration state and detector stability state, is to identify which of the available system diagnostic channels are to be monitored. At least one channel is required such as system pressure of the LC instrument. Only the selected channels are subject to following analysis in connection with calculating one or more parameters based on the data channel.

It should be noted that an embodiment in accordance with techniques herein may specify a maximum amount of time or a timeout period within which equilibrium is expected to be achieved. If the system is unable to equilibrate within this maximum amount of time, an error condition may be determined with one or more resulting actions taken. For example, such actions may include notifying an operator, manager or other user of the system since inability to equilibrate within this maximum amount of time may indicate problems with the system requiring further analysis and troubleshooting prior to continued use. Consistent with techniques herein, the determination of when an amount of elapsed time waiting to achieve equilibration has exceeded the maximum amount of time may be performed automatically, for example, using software executing on a processor that monitors the current state of the system to determine if specified equilibration or starting conditions are achieved, measures elapsed time waiting for equilibration to be achieved, compares the elapsed time waiting for equilibration to the maximum amount of time, and automatically provides user notification if equilibration conditions are not achieved prior to the elapsed time exceeding the maximum amount of time.

An embodiment in accordance with techniques herein may select one or more data channels for monitoring. The following includes a list of data channels from which one or more may be selected for monitoring in connection with techniques herein:

column temperature (e.g., observed or measured column temperature or of the column compartment including the column);

sample temperature (e.g., observed or measured sample temperature such as in the compartment or component storing the sample);

detector temperature;

system pressure (e.g., denoting the pressure of fluid in the column, or more generally the system) or pressures (in the case of multidimensional chromatography);

compression to decompression (C/D) ratio (e.g., a number of compression motor steps divided by a number of decompression motor steps. In every pump cycle, the primary pump head decompresses to atmospheric pressure during the intake stroke. A digital pump control monitors the number of motor steps required for the head to reach atmospheric pressure. Once the decompression is finalized, the intake stroke takes place. Following the intake stroke, the primary pump head pre-compresses. Thereafter, the primary pump head compresses the fluid in the head to operational system pressure before the primary head goes on line and delivers the fluid to the system. The electronics and control algorithm also monitors how many motor steps it takes to bring the fluid in the head up to system pressure. In a properly functioning pump, with a fluid of low compressibility, the ratio ideally approaches unity. A criterion for the C/D ratio channel may therefore be defined to include one or more desired C/D ratios.);

column preheater or precooling unit temperature (e.g., measured temperature of an oven or cooling unit included as a component prior to the column in FIG. 1 that heats or cools, respectively, the fluid flow therethrough); and detector signal (e.g., for an MS detector, the intensity or ion count at particular m/z (mass to charge) values detected).

Additionally, it should be noted that an embodiment may also select other data channels for monitoring such as an additional detector data channel that may vary with the type of detector. For example, in connection with a detector that is an MS, the vacuum level of the MS detector may be monitored as an additional data channel. Generally, the particular one or more channels monitored as well as the particular parameters or metrics utilized may vary with the particular embodiment.

In real time, a linear regression may be performed on the acquired data points of each channel within a fixed time window leading up to the present moment. The time window may be user defined (e.g., by an instrument supplier or other experienced/knowledgeable user that may define the time window for customer use), or otherwise set to a default value such as ten (10) seconds. (The actual number of points entering into the data reduction is time window multiplied by data rate.) For the data points in the time window, the mean value ("level") of the data set is calculated. The data set/data points in the time window may be subject to a least-squares linear fit, producing slope. In addition, the absolute difference between maximum and minimum Y values over the data set is captured as peak-to-peak variability denoting the noise of the data set for the time window. Data reductions occur at a nominal rate, with a corresponding incremental advancement of the time window, such as every second or two.

Figure 4:
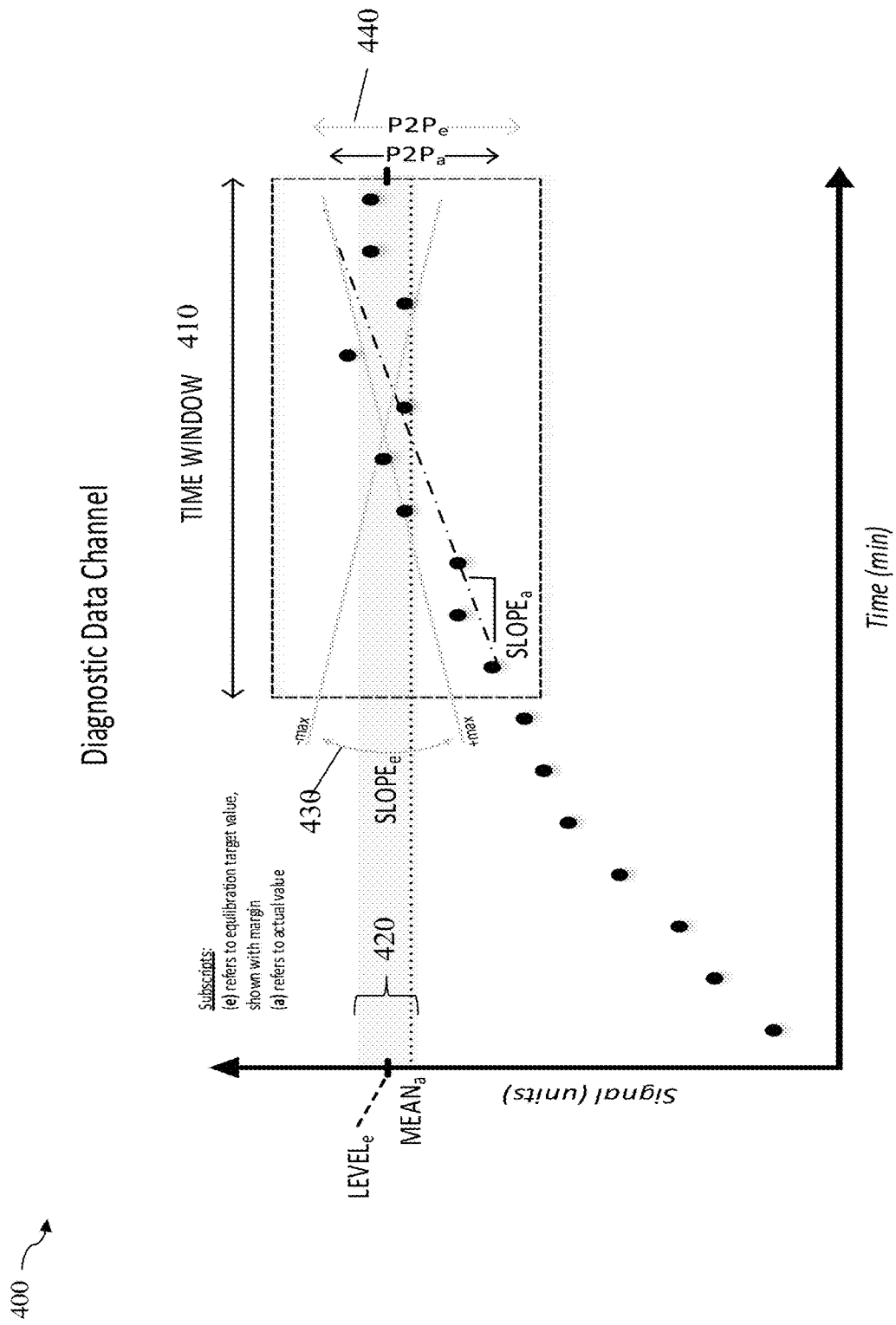
FIGS. 4, 5 and 6A are graphical illustrations of data collected in an embodiment in accordance with techniques herein for selected data channels.

With reference to FIG. 4, shown is an example 400 illustrating data points collected during monitoring of a single diagnostic data channel in an embodiment in accordance with techniques herein. The example 400 includes a graphical illustration of data points acquired for a diagnostic data channel. In particular, 410 may denote a time window including those data points acquired during a defined time window for the single data channel as discussed above which may be subject to curve fitting and analysis, such as using linear regression of the data points in 410, or more generally any suitable technique known in the art.

For each selected channel, the criteria of the starting state may include conditions for one or more selected types of parameters or metrics:

1. Level may be specified as a numerical target value, plus or minus a margin. The margin may be expressed in terms of parameter units, such as an integer or other numeric absolute value, or may be expressed as a percent of the target value. (Example: require system pressure to be 10000 psi±500 psi, or 10000 psi±5%.).

2. Slope may be defined as being smaller than a given pitch, specified as absolute value (unsigned). Alternatively, the slope can be specified as a percent of mean per minute. (Example: require slope m to be $-0.05 \leq m \leq 0.05$ AU/min, or $-0.5\% \leq m \leq 0.5\%$ mean(y)/min. The foregoing mean y may be the mean of the data points in the particular time window).

3. Peak-to-peak may be specified as a non-negative value below a given threshold or target value (e.g., amplitude target), where the threshold or target value may be expressed as a numerical value, or in terms of parameter units or percent of mean. (Example: require peak-to-peak (pp) to be $pp \leq 0.1$ AU, or $pp \leq 2\%$ mean(y), where y denotes the mean of the population of data points in the particular time window.)

4. Second derivative with respect to the data points in the time window. For example, as an indicator of stability, the system may declare itself "equilibrated" when the second derivative of system pressure has reversed its numeric sign some minimum number of times following a method change.

In connection with signals of diagnostic data channels for which slope and/or peak to peak parameters are determined, the criteria specified above denoting required values or ranges for slope may approximate a minimum absolute value of slope, and for peak to peak may approximate a minimal amount of noise thereby denoting that the desired signal of the data channel approximate a smooth straight line (having little or no slope thereby denoting no noise or an amount of noise within acceptable limits/thresholds).

It should be noted that in at least one embodiment and depending on the particular instrument system, some diagnostic channels may be read backs that are directly related to a set point derived from the method. For example, if column temperature is specified in the method, then the level specified, if enabled, may implicitly come from the method itself rather than, for example, a configuration setting, or generally any other suitable means.

In one embodiment, the time window identifies an amount of time in which to look back and consider preceding data points when calculating level (e.g., mean), slope, and other parameters for a current point. For example, assume a new data point is acquired every second and that the time window is 10 seconds. A new data point may be received for the data channel at time N for which the level and slope parameters are selected. For the new data point at time N, the level and slope parameter values are determined using the new data point acquired at time N and additionally using the 9 preceding data points acquired at times N−1 through N−9. The foregoing may be performed in connection with each newly acquired data point of the data channel where the time window advances continuously to the next point in time and accordingly performs level and slope parameter calculations using the current newly acquired data point and the 9 preceding data points acquired at the 9 prior successive points in time denoted by the time window.

Additionally, some embodiments may include yet another type of derived or composite parameter having a time dependent Y value determined using multiple data channels. For example, an embodiment in accordance with techniques herein may include a composite parameter that is a ratio of two measured values from two different data channels at a same point in time. For such a ratio, any one or more of the foregoing data channels may be specified. To further illustrate, an embodiment may have a derived or composite parameter that is a ratio of the slope and peak to peak measurement of a particular data channel. As another example, an embodiment in accordance with techniques herein may have a derived or composite parameter that is a ratio of a selected type of parameter or metric as described herein (e.g., level, slope, peak to peak, or second derivative) of system pressure with the same or different selected type of parameter or metric (e.g., level, slope, peak to peak, or second derivative) of column temperature.

Finally, for each selected parameter for a data channel, the criteria are required to hold steady for a minimum independent stasis time. For the slope example above, a stasis time of 1.0 minutes dictates that the requirement shall be satisfied if slope remains in the range (0.05, 0.05) for a minimum of 1.0 minutes. Note that as described herein, rather than express in terms of time, such values may be expressed in terms of column volumes. Readiness thereby establishing the starting state conditions have been achieved may be determined when requirements of all parameters for all diagnostic data channels have been satisfied and may be observed as such simultaneously.

With reference to FIG. 4, for time window 410, consider a data channel having the level parameter and associated conditions of the criteria as specified above. In this case, an average or mean value, MEANa, may be determined with respect to the data points in time window 410. Evaluating may include determining whether the target value, LEVELe+/−specified margin value (as included in the condition of the starting state criteria) has been met by determining whether MEANa falls in the range LEVELe+/−specified margin value. Element 420 denotes the target range for the level parameter for the illustrated data channel where the target range is LEVELe+/−specified margin value (as included in the condition of the starting state criteria). Although the mean or average of the time window is used as described above, more generally, an embodiment in accordance with techniques herein may use other suitable statistics in connection with determining the actual value of the level parameter for a current point in time. For example, an embodiment may use a weighted average of the data points in the time window where one or more most recent data points may have more weight than other data points.

In a similar manner to 420, element 430 denotes the specified target range for the slope parameter of the illustrated data channel. In this case, an actual slope value of SLOPEa may be determined with respect to the data points in time window 410. Evaluating may include determining whether the target slope value, SLOPEe+/−specified margin value (as included in the condition of the starting state criteria) has been met by determining whether SLOPEa falls in the range SLOPEe+/−specified margin value. Element 430 denotes the target range for the slope parameter for the illustrated data channel where the target range is SLOPEe+/−specified margin value (as included in the condition of the starting state criteria).

In a similar manner to 420 and 430, element 440 denotes the specified target range for the P2P or peak to peak parameter of the illustrated data channel. In this case, an actual P2P value, P2 Pa, may be determined with respect to the data points in time window 410. Evaluating may include determining whether the actual P2 Pa value is less than the specified delta value or margin value, denotes as P2Pe (as included in the condition of the starting state criteria). In other words, a determination is made if P2 Pa is within the target range denoted by P2Pe of the criteria.

Consistent with discussion herein, the starting state, denoting LC equilibrium and possibly one or more other conditions of stability for other components, such as detectors, of the system, may be expressed generally as a function of one or more parameters and associated conditions denoting target or initial conditions that must be determined to exist for a specified amount of time in order for techniques herein to determine that the starting state has been established in the system.

At least some embodiment in accordance with techniques herein may include at least system pressure, column temperature and detector signal as the 3 monitored channels. In such an embodiment, any one or more of the above-noted parameters types (e.g., slope, level, peak to peak, second derivative) may be specified for each of the monitored channels. For example, for the detector signal, any of slope and peak to peak parameters may be included in criteria of a starting state An embodiment may also determine additional metrics that may be used for general diagnostics serving as indicators of the system health. Such additional metrics may include, for example, time to ready (how long it took the system to achieve the current starting state) and time since ready (how much time has elapsed in an uninterrupted starting state or how long the current starting state has been maintained). The foregoing as well as other suitable metrics have potential value for used in connection with internal diagnostic purposes. For example, if time to ready exceeds an expected threshold value, it may mean that one or more components of the system may be unhealthy thereby requiring replacement or repair.

An embodiment may also include additional enhanced data analysis including pattern matching to recognize and determine whether a data channel signal matches an expected characteristic signature or curve, or characteristic thereof. For example, it may be that the expected curve of the signal for a diagnostic data channel does not approximate a straight horizontal line with little or minimal slope and little or minimal noise. In such a case, the expected curve of the signal may be expressed as a signature and compared to an observed or actual signal trace using any suitable pattern matching technique. For example, the actual signal trace may be expected to have a number of peaks and thus changes in sign of slope, may be expected to have a number of changes in sign of the second derivative, and the like. The foregoing may be used in combination with possibly other conditions of criteria described herein. For example, a data channel's signal may be expected to have a number of peaks and thus changes in sign of slope, may be expected to have a number of changes in sign of the second derivative, and the like, as described above. Once the foregoing has been detected, it may subsequently be expected that the signal has a specified value as in connection the target parameter described above, or that the signal then approximates a straight horizontal line with little or minimal slope and little or minimal noise. The foregoing may be illustrated with reference to the example 500 of FIG. 5. In the example 500, the illustrated graph may include two plotted Y values—on the left Y axis is system pressure in PSI units, on the right Y axis is temperature in degrees Celsius. The X axis is the horizontal time axis in minutes. Line L1 may denote the observed or measured temperature of the LC column over time and line L2 may denote the observed or measured system pressure over time. During operation, the method may change the column temperature set point from 25 to 45 degrees (such as by increasing the set point of the heater or oven of the column to 45 degrees) at time T1. Responsive to such an increase in temperature, the fluid viscosity decreases and the system pressure also decreases such as illustrated by Line L2 between times T1 and T2. The column also is expected to experience an increase in temperature during time interval T3 following time T2. The foregoing increased in column temperature observed during the time period denoted by T3 may be due to the frictional heating within the column. Following the foregoing curve or peak denoted during T3, the column temperature is expected to decrease and level off to approximate a smooth horizontal line with little or no slope and little or no noise. The foregoing leveling off of column temperature may be detected, for example, beginning at time T4. The foregoing signature curve of L2 may recognized in connection with an observed set of data points for the system pressure data channel using any suitable technique such as, for example, based on expected changes in slope and/or slope sign at different points in time (e.g., negative slope sign between T1 and T2, positive slope sign between T2 and T3, negative slope sign between T3 and T4 and then little or no slope from time T4 for a specified time period and little or no peak to peak noise from time T4 for the specified time period).

Figure 5:
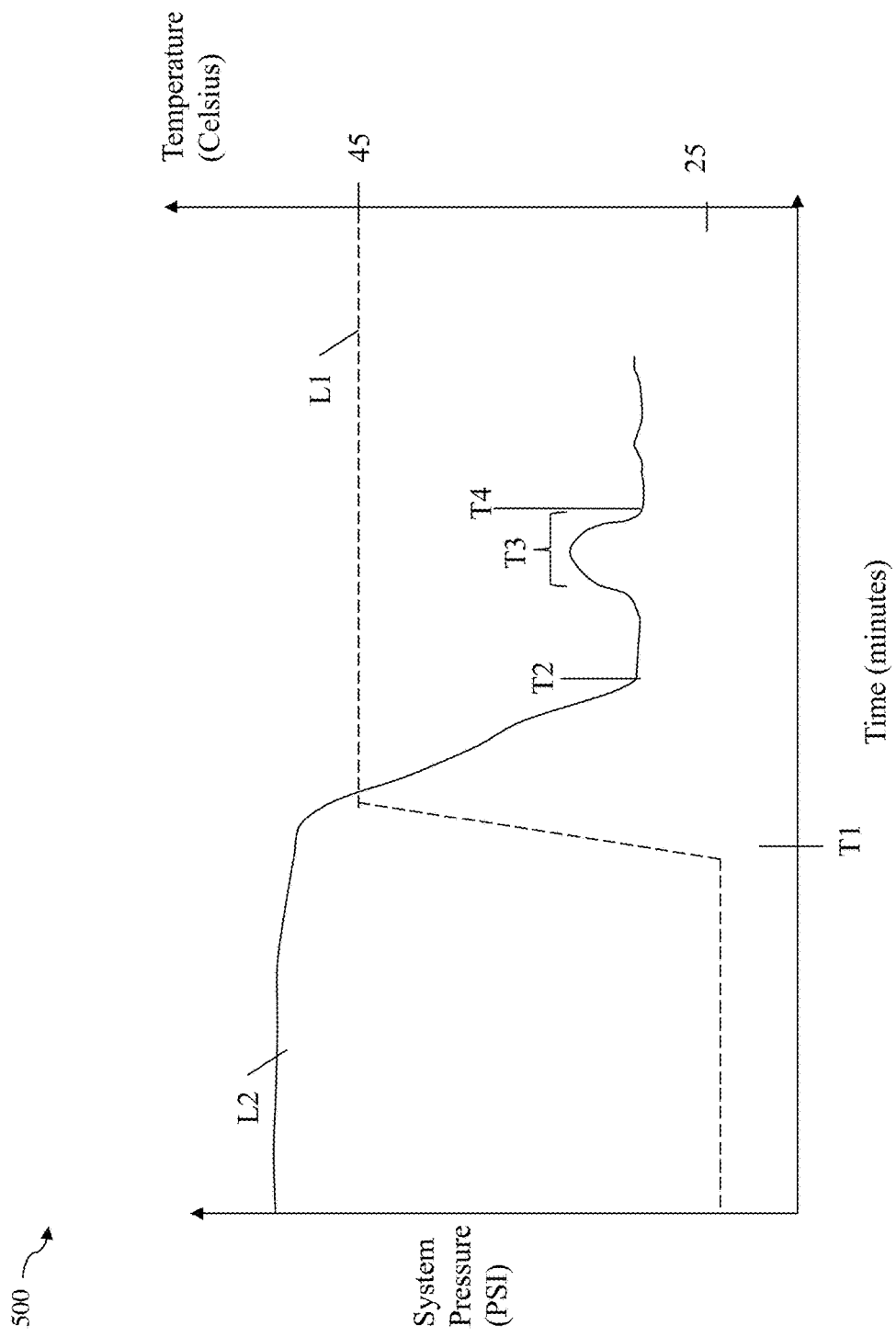

Additionally, in connection with FIG. 5, the foregoing initial negative sign in slope of Line L2 between T1 and T2 should occur or overlap at common points in time when the temperature increases having a positive slope as indicated by L1 after time T1. Thus, the pattern matching or recognition technique may include recognizing temporal dependency between the temperature increase at time T1 causing the resulting negative pressure slope of L2 between T1 and T2.

Figure 6A:
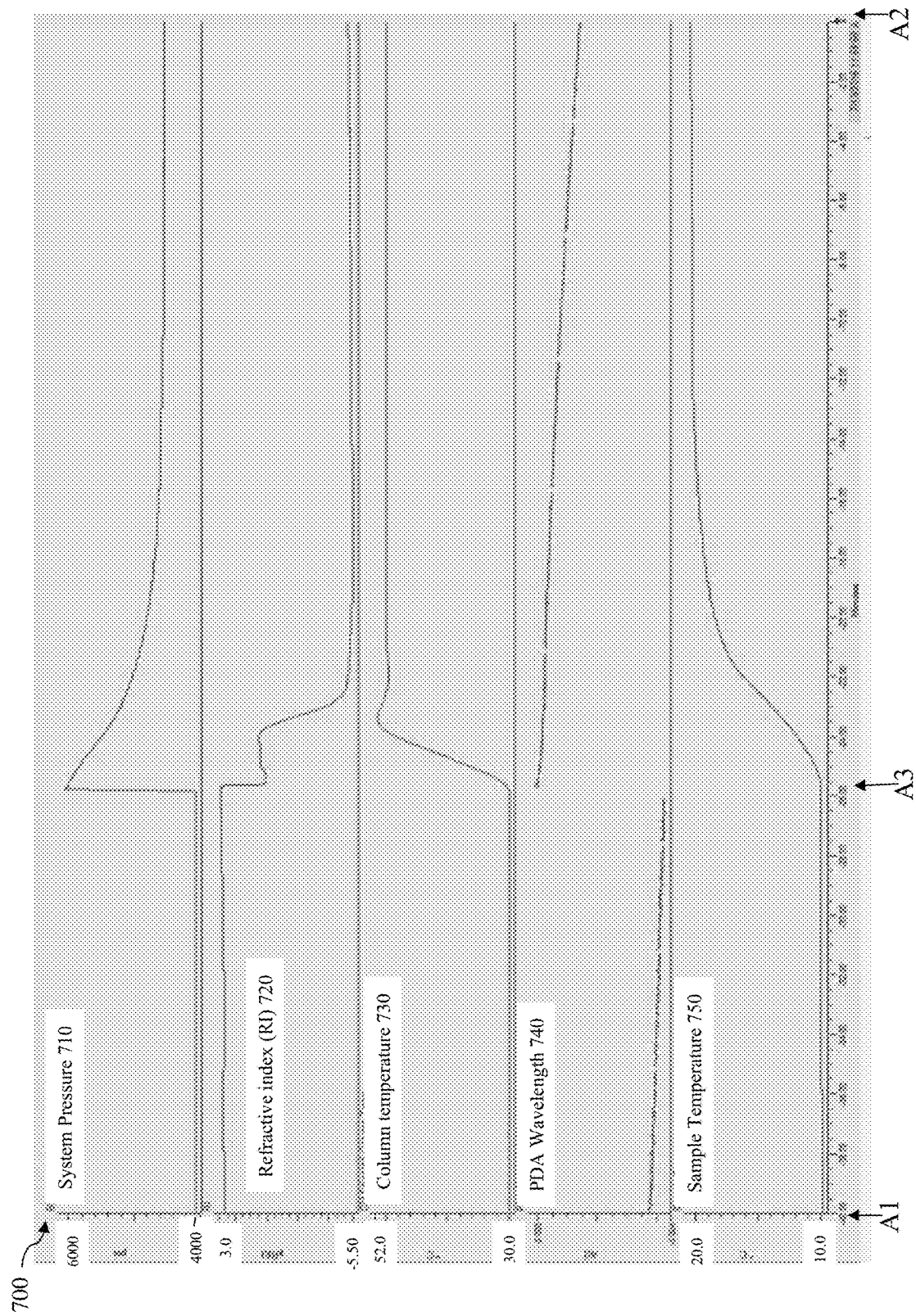

Referring to FIG. 6A, shown is an example 700 of several signals that may be monitored as they transition from one starting state on the left to a second starting state on the right (e.g., transition from state of equilibration or stability on the left to a new state of equilibrium or stability on the right). The signals monitored in connection with the example 700 may include an LC and a PDA detector such as described elsewhere herein and known in the art. Elements 710, 730 and 750 are signals of channels monitored in connection with the LC (and thus may be used in connection with determining and defining LC equilibrium), and elements 720 and 740 are of signals of monitored channels in connection with the PDA detector (and thus may be used in connection with determining and defining stability and/or equilibrium of the detector).

The example 700 includes at the bottom on the X axis a time dimension in minutes ranging from −40.00 at the leftmost point of origin A1 to the rightmost value of 0.0 (corresponding to the current time) at point A2. At or about the −26 minute mark (as denoted by A3), a new method is loaded which changes the flow rate from 0.4 mL/min to 0.6 mL/min. The top trace (signal) 710 is the system pressure which, in at least some embodiments, cannot be set such as by specifying a set point. Rather, the system pressure signal trace illustrated in 710 over time may result as a reaction to changes or settings in the other parameters of the method such as the above-mentioned flow rate and others set as column temperature described below. System pressure 710 includes a Y axis of pressure values in PSI (pounds per square inch) units ranging from 4000 to 6000 PSI.

The new method also sets a new column temperature (third signal down as illustrated in plot 730) set point to be 50 degrees C. (Celsius) from a prior 30 degrees C., and also sets new sample compartment temperature (e.g., change setting in sample compartment, bottom signal trace 750) from 10 degrees C. to 20 degrees C. The column temperature set point may be modified, for example, by setting an oven or heater of the column compartment to the new set point of 50 degrees C. and then observing the actual column temperature change over time responsive to the new set point. The trace signal 730 may denote the observed column temperature values. Finally, the new method also changed the PDA wavelength (fourth signal trace down 740) from 210 nm to 230 nm. The refractive index (RI) detector (second signal trace down 720) was not changed, but is very sensitive to temperature and responds to the foregoing change in column temperature.

Plot 720 illustrates changes in the RI (Y axis) over time (X axis) where the RI values on the Y axis are in μRIU or micro refractive index units, and the Y axis specifies a range from a minimum of −5.50 at the origin of 720 to a maximum of 3.0 μRIU. Generally, RI may be described as the ratio of the speed of light in the sample compared to that of a reference medium such as air or water. A μRIU is 1/1000000 of an RIU and is a convenient scale for most LC separations.

Plot 730 illustrates the change in the column temperature measured or observed responsive to changing the column set point, for example, as specified from an existing 30 degrees C. to 50 degrees C. in the new method. Plot 730 illustrates changes in measured or observed column temperature (Y axis) over time (X axis) where the temperature on the Y axis is in degrees Celsius and the Y axis specifies a range from a minimum temperature of 30 to a maximum of 52 degrees Celsius.

Plot 740 illustrates a change in PDA absorbance (Y axis) over time (X axis) where the Y axis is in Absorbance Units (AU) derived from the Beer-Lambert Law and range from a minimum value of approximately −0.004 to approximately 0.000 AU.

Plot 750 illustrates a change in measured or observed sample temperature (Y axis, degrees Celsius units) over time (X axis) responsive to the new sample temperature specified in the new method. The Y axis of 750 specifies a range from a minimum of 10.0 to a maximum of 20.0 degrees Celsius.

It should generally be noted that the specific ranges and values in the various plots of the example 700 of FIG. 6A will vary from embodiment to embodiment. What is important to note in connection with the plots of the example 700 and as described herein is the change in the various signals.

In an embodiment in accordance with techniques herein, criteria of the starting state may be specified for the 5 signals of the example 700 to determine when a system including the LC and PDA detector noted above has reached the starting state. For example, the starting state criteria may require that system pressure signal of 710 approximates a flat or smooth line by examining a first parameter that is the slope (denoting drift) of 710, and a second parameter that is the peak to peak measurement denoting noise of 710 (e.g., minimal or no slope, and minimum or no noise denoted by the peak to peak parameter). As described elsewhere herein, the foregoing two parameters may be required by the criteria to remain within specified tolerance ranges for a specified time period.

In connection with specifying a new set point, such as for the column temperature, plot 730 illustrates the measured temperature of the column responsive to specifying the new method set point at time A3 as described above. The criteria of the starting state may calculate and monitor 3 parameters in connection with the measured column temperature signal 730—a level, slope (denoting drift), and peak to peak measurement denoting signal noise. As described elsewhere herein, the foregoing 3 parameters may be required by the criteria to remain within specified tolerance ranges for a specified time period. Generally, an embodiment in accordance with techniques herein desires such criteria for the first parameter, level, determined for column temperature to denote a constant steady temperature over time (or column volumes) with little or no variation from the specified set point. Such criteria for the slope and peak to peak parameters determined for column temperature approximate a flat or smooth line (e.g., minimal or no slope, and minimum or no noise denoted by the peak to peak parameter).

In connection with the RI index 720 and PDA wavelength 740, an embodiment in accordance with techniques herein may specify criteria defining when values for the foregoing two channels denote the detector is in a stable state. For example, the criteria of the starting state may include a level parameter for the RI index, for example, requiring that the RI index value be within a specified range for a minimum amount of time. The criteria may also include a level parameter for the PDA wavelength requiring that the PDA wavelength be within a specified range for a minimum amount of time.

Still referring to FIG. 6A, an embodiment in accordance with techniques herein may also include performing pattern matching and recognition to recognize the temporal causation and overlap or dependencies of changes between the different diagnostic channels 710, 720, 730, 740 and 750. For example, the time A3 at which the new method changes various operating parameters such as changing flow rate, the column temperature set point, and the like, may be noted whereby expected changes in observed data channels may be observed simultaneously or commencing at a common point in time.

Additionally, use of techniques described herein may be further used more generally in connection with other diagnostic data channels for general system health and monitoring. For pump stroke quality of the LC, a data channel that may be monitored relates to detected plunger velocity, motor steps, and/or other movements of the pump 108 (such as in FIG. 1). As known in the art, such as in connection with various LC instrument systems and components from Waters Corporation, in connection with movement of solvent, the pump 108 may include pump heads from which solvent is pumped into the fluid path to carry the sample. In at least one embodiment, for diagnostic purposes of monitoring pump stroke quality (which would require pattern recognition), data channels for pressure of pump heads may be monitored and may include, for example, Pump A Primary Head Pressure and Pump B Primary Head Pressure. During a pump cycle, the primary head has a role to play as does the accumulator head. Each has a distinctive pressure pattern or signature when such components are healthy and complete the pump cycle successfully. When not successful, the pressure patterns can deviate from such signatures of the expected pressures over the pump cycle time. Thus such a pattern of expected pressures may be compared to observed pressures during operation to determine whether the observed pressures match the expected pressures (e.g., within some specified limit) in order to determine the LC system is healthy and thereby ready to perform sample analysis. As a further example, during a pump cycle, as also known in the art, is a transfer phase when total system flow is transferred to the primary head so that the accumulator head is able to retract its plunger and refill. The transfer phase also has a well characterized pressure pattern when successful whereby such a pattern of expected pressures may be compared to observed pressures during operation to determine aspects of LC system health. Generally, observed values may be compared with expected values of a pattern associated with a healthy state and if the observed values match the expected values (within specified limit(s)), a status of healthy may be determined (whereby the LC system is ready to perform sample analysis); and otherwise a status of unhealthy may be determined (whereby it may be determined that the LC system is not ready to perform sample analysis).

It should be noted that the foregoing paragraph generally described a technique in connection with pump pressures, whereby observed values may be compared to expected values of a known pattern or signature. As will be appreciated by those skilled in the art, such techniques may be more generally applied and used with observed values, expected values, and known pattern or signature with respect to any suitable component and associated parameter or data value and is not limited to the particular use case noted above for purposes of illustration.

In addition, the computer 116 may process the data received via the monitored data channels using various processing algorithms (e.g., artificial intelligence algorithms, machine learning algorithms, etc.) to determine proper functionality of the system 100. For example, by using the processing algorithms, the computer 116 may generate new expected threshold values for various components of the system 100. Similarly, the computer 116 may modify existing expected threshold values. Such new and/or modified expected threshold values may then be used to define a state of equilibrium, healthy operating conditions, and/or starting conditions for the system 100, which may be used in subsequent experiments and/or analyses. In some embodiments, the new and/or modified expected threshold values, defined states of equilibrium, healthy operating conditions, and/or starting conditions for the system may be outputted to a user for approval.

For example, the computer 116 may determine a proper pressure profile for a programmed chromatographic gradient. In one embodiment, the computer 116 may receive input specifying a proper pressure profile. The computer 116 may then monitor the proper pressure profile against specified limits (or thresholds) during subsequent experiments and/or analyses. In other embodiments, the computer 116 may monitor quality attributes in the data received from the data channels, such as pressure level, pressure noise, and pressure slope, until such quality attributes meet acceptable values. The computer 116 may then modify the proper pressure profile (and/or define a new proper pressure profile) by applying the processing algorithms to the quality attributes. The modified pressure profile may then be used to maintain consistent and appropriate performance over subsequent experiments and/or analyses.

In embodiments in accordance with techniques herein, the monitored data channels (or other data sources) may include data specifying an impedance of the LC column, the physical properties of the solvents, flow rates, and the commanded gradient table. In operation, the system 100 may attempt to meet the requirements of the pressure trajectory, and the computer 116 may monitor quality attributes for column pressure and flow rate via the data channels. For example, the monitored quality attributes may include pressure modulation (noise), pressure slope, and the C/D ratio. Based on the processing algorithms applied to the data received via the monitoring, the computer 116 may determine that not only did the system remain within the boundaries of the pressure trajectory envelop, but that the pump was performing within acceptable limits during the propagation of gradient. In this fashion, the computer 116 may determine that the pressure trajectory was correct and the pump performance was acceptable. As such, the computer 116 may determine that the gradient pressure profile was generated correctly, and store an indication of the gradient pressure profile for future use. Doing so allows the system 100 to reference the stored gradient pressure profile against subsequent chromatographic runs to determine whether the system has reached a starting state and/or is operating properly.

Further in connection with general system health indicators, detector signals may be monitored for other parameters such as characteristic peak shape associated with leaks, pressure variability, solvent quality, and the like. As a long term diagnostic, techniques herein may accumulate and analyze trends in such things as equilibrated system pressure level (e.g. which may increase over many runs due to column aging, or decrease due to leaks or elasticity in tubing), column equilibration time (e.g. time it takes for the LC to reach LC equilibration—as may be defined in conditions of criteria of the starting state—where such time may increase due to one or more unhealthy conditions such as damaged oven seals), and the like.

With respect to collecting data points for a monitored data channel, several alternative approaches may be used in an embodiment. To improve data reduction on the points contained in the moving time window 410 (as in FIG. 4), the analysis may optionally include the application of a software low pass filter to exclude statistically insignificant outliers. The filtered stream could then be subjected to subsequent processing as described herein, such as, for example, linear regression, curve fitting, pattern recognition techniques, and the like, as described above.

An embodiment in accordance with techniques herein may also automate some of the instrument control that is typically necessary to ensure fluidic system integrity. For example, some methods take advantage of solvent switching valves when available, to choose among alternative solvent sources. Upon actuation of the valve, the internal volume of the valve as well as associated tubing must be flushed with the new solvent. This control could be performed under the direction of software performing techniques herein such as responsive to a method switching solvent sources.

Separation methods consume well characterized chemicals. Based upon physical properties of these chemicals, including their miscibility with one another, and the known fluidic impedance of the system, theoretical operating system pressures may be determined mathematically where such values may be used in various criteria denoting the starting state (e.g., specified target value for use with level parameter).

When a system is operated in a fashion that uses significantly different solvent combinations from sample to sample, the risk of sequencing chemically incompatible mixtures is a reality. Sudden changes in viscosity arising from incompatible mixing can cause undesirable changes or adverse effects, for example, to system pressure. Furthermore, solute precipitation is a problem both for the analysis and the physical instrumentation. With the proper solvent characteristic data and expert user definitions, techniques herein may use automation to mitigate such concerns.

Figure 6B:
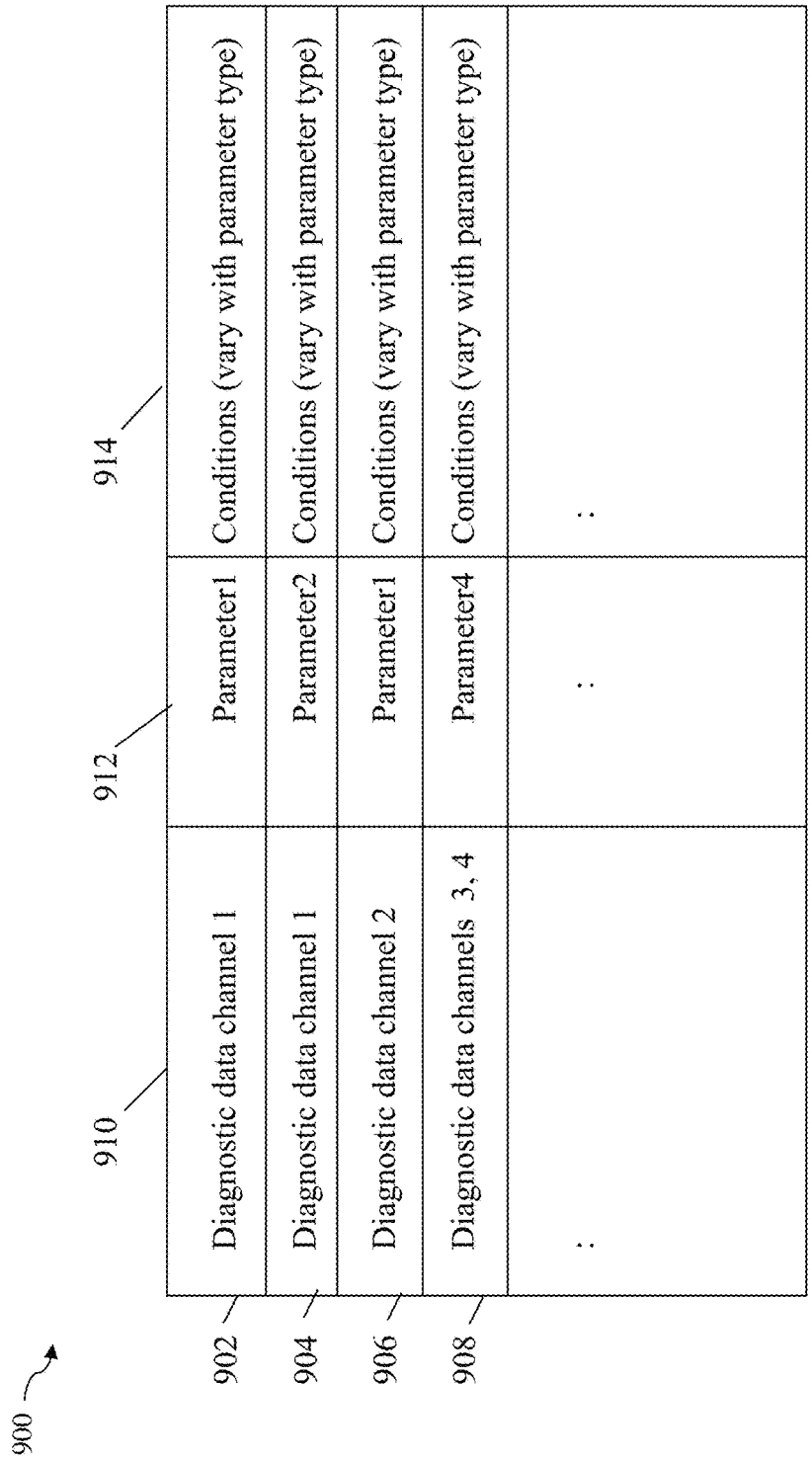
FIG. 6B is an example illustrating information that may be included in criteria defining a starting state, and thus, defining a state of system equilibration.

Referring to FIG. 6B, shown is an example 900 of information that may be included in the criteria defining a starting state such as denoting the equilibration of the system in an embodiment in accordance with techniques herein. The example 900 includes such information in tabular form for presentation purposes but may be stored in any suitable structure. The example 900 includes column 910 of diagnostic data channels selected, column 912 of parameters selects, and column 914 conditions to be met for actual values of determined for the parameters of 912 in order for a determination to be made that the starting state is established denoting the state of equilibration of the system. Each row, such as 902, 904, 906 and 908, denote information of the criteria specified for a single parameter. Row 902 indicates that diagnostic data channel 1 is monitored and an actual value for parameter 1 is determined using the diagnostic data channel 1. The conditions in row 902, column 914 specify conditions to be met by the actual value for parameter 1 as part of establishing a starting state. The conditions in 914 may vary with the particular parameter. For example, row 902 may indicate to monitor channel 1, which may be system pressure, and parameter 1 may be the slope parameter. Thus, processing for determining whether a starting state is established in a system include determining an actual value for the slope of the system pressure and determining whether the actual slope value has met the specified slope target of the conditions in column 914 (row 902). In a similar manner, such processing may be performed with respect to rows 904, 906 and 908 to determine whether actual values for such parameters meet specified conditions. In order to establish the starting state, the conditions in column 914 must be simultaneously met by all actual values determined for all parameters in column 912. Additionally, such actual values must meet the conditions in 914 for at least a minimum amount of time denoting the stasis time or wait time as described herein.

In at least one embodiment, a single, global stasis time may be specified that may be applicable to all data channels and parameters whereby, during the global stasis time, all monitored values must remain within target range. As a variation to the foregoing, an embodiment may provide for an independent stasis time for each monitored data channel, or more specifically, for each individual parameter of each monitoring data channel whereby equilibration is affirmed/reached when all monitored channels and associated parameters have independently met their targets for the individually specified stasis times. To further illustrate, parameter P1 for data channel A may have a specified stasis time T1 whereby the specified conditions for P1 need to be held or maintained for the specified stasis time T1. Additionally, parameter P2 for data channel B may have a specified stasis time T2 whereby the specified conditions for P2 need to be held or maintained for the specified stasis time T2. Equilibration is reached/affirmed when both P1 maintains its associated conditions for time period T1 and also when P2 maintains its associated conditions for time period T2. Failure of one or more of P1 and P2 to simultaneously maintain associated conditions for their respective individual stasis times, T1 and T2, results in equilibration not being met/affirmed.

In connection with row 908, it should be noted that the parameter 4 may be a composite parameter based on multiple diagnostic data channel 3 and 4, such as the ratio parameter described elsewhere herein.

Figure 7:
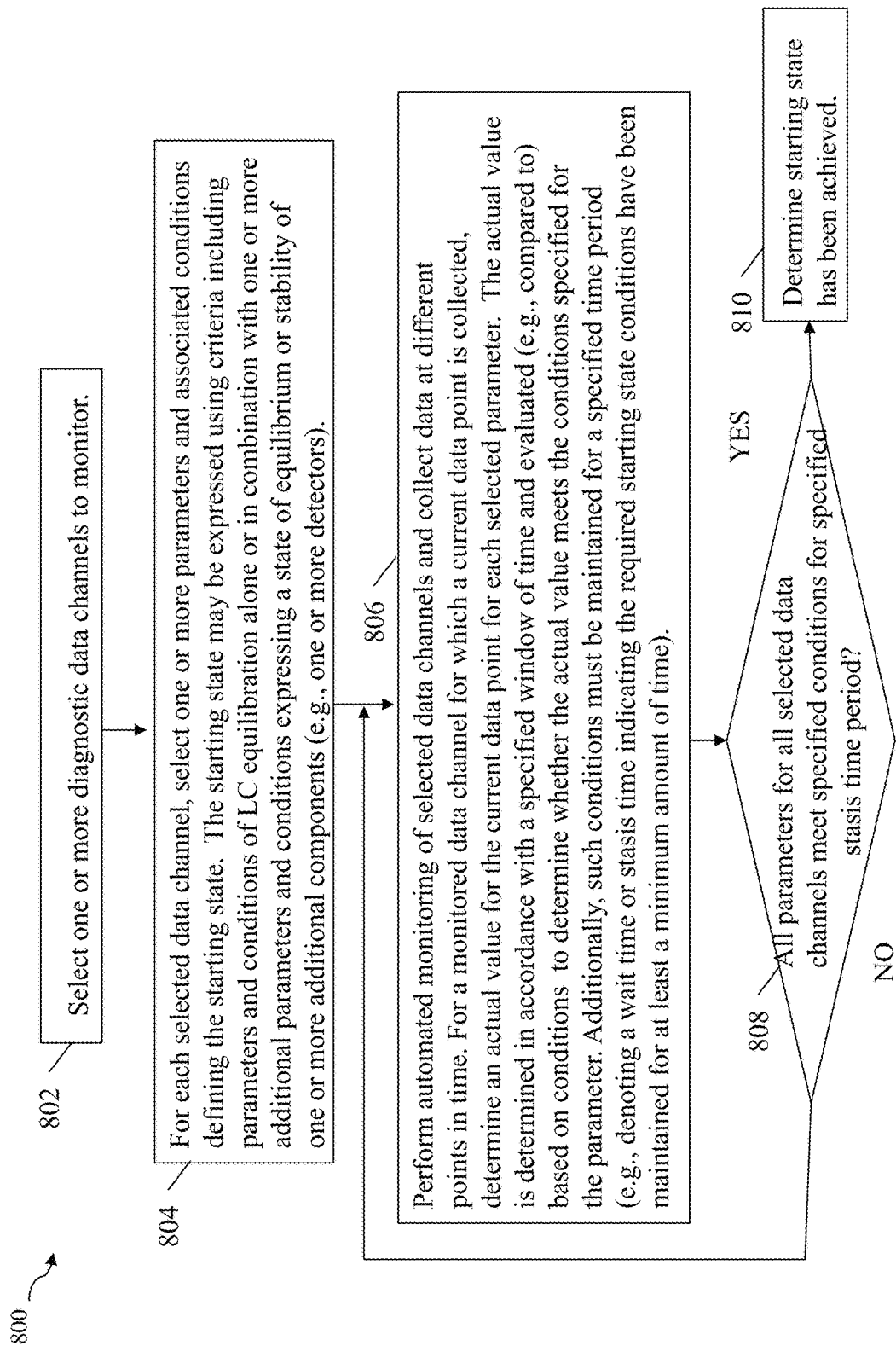
FIG. 7 is a flowchart of processing steps that may be performed in an embodiment in accordance with techniques herein.

Referring to FIG. 7, shown is a flowchart of processing steps that may be performed in an embodiment in accordance with techniques herein. The flowchart 800 summarizes processing described above. At step 802, one or more diagnostic data channels may be selected for monitoring. At step 804, for each selected data channel, one or more parameters and associated conditions are specified. The collection of such parameters and associated conditions for the selected data channels are included in criteria defining the starting state. Consistent with discussion herein, the starting state may denote a state of system equilibration and may be expressed using criteria including parameters and conditions of LC equilibration alone or in combination with one or more additional parameters and conditions expressing a state of equilibrium or stability of one or more additional components (e.g., one or more detectors). Additionally, a time period or stasis may be specified denoting a minimum amount of contiguous time that the specified conditions of the starting state must be maintained simultaneously (e.g., maintained with respect to all actual values for all parameters and associated conditions across N points in time where N denotes the amount of time of the time period or stasis time). In order for the starting state to be achieved, actual values for all parameters for all selected channels denoting a current state of the system must be maintained simultaneously for the particular stasis or wait time that may be specified for each parameter. Consistent with discussion herein, such amount of time or stasis time may also be expressed as a number of column volumes. Thus, the starting state may be expressed as a function of the different parameters across all selected data channels and specified target conditions (e.g., in terms of target values or goals as well as specified stasis times). The starting state may be met or achieved when a determination is made that all of the foregoing parameters meet specified target conditions (e.g., in terms of target values or goals as well as specified stasis times). For example, consider a starting state with 2 selected data channels of the LC system—the LC pressure and LC column temperature. In such an instance, the starting state may express or define LC equilibration only without additional parameters and conditions such as related to detector stability or equilibrium.

In this example, for the LC column temperature data channel, the level parameter may be selected as denoted by X1. For the pressure data channel, two parameters may be selected—X2 denoting the slope parameter for system pressure and X3 denoting the peak to peak or noise parameter for system pressure. Each of the foregoing parameters X1, X2 and X3 has its own defined target (e.g., target value, range, tolerance or allowable difference between actual and target value denoting one particular condition required to achieve equilibrium). Additionally, each of the foregoing parameters X1, X2 and X3 may have its own individual stasis time. For example, D1, D2 and D3 may respectively denote the individual stasis times for X1, X2 and X3. A state of equilibrium using the foregoing starting state criteria may be achieved when each of the specified 3 parameters has an actual value (determined from measured or observed values of the parameter calculated using data of the particular associated data channel) that meets its specified target and maintains such target conditions for the specified stasis time period of the individual parameter. Thus, whether equilibrium, or more generally, the starting state, is established or achieved may be determined by first determining whether actual values for each of the parameters X1, X2 and X3 meet specified targets (e.g., determine an individual Boolean result for each of the parameters denoting whether the current actual value for the parameter meets its target for the specified stasis time period), and then secondly performing a logical AND operation with respect to each of the specified parameters by logically ANDing the individual Boolean results for all parameters. For example, in a system having 3 parameters X1, X2 and X3 as noted above, equilibrium, or more generally the starting state is established when a first actual value O1 for parameter X1 meets its specified target T1 for time period D1, when a second actual value O2 for parameter X2 meets its specified target T2 for time period D2, and when a third actual value O3 for parameter X3 meets its specified target T3 for time period D3. Additionally, the foregoing conditions must be met and maintained simultaneously for the specified individual stasis time periods D1, D2 and D3 for the different parameters X1, X2 and X3.

Thus, after completion of step 804, the criteria defining the starting state has been specified. From step 804, control proceeds to step 806. In step 806, processing is performed for automated monitoring of the selected data channels to collect data for all selected data channels at different points in time. For a monitored data channel for which a current data point is collected, processing may determine an actual value for the current data point for each selected parameter. The actual value is determined in accordance with a specified window of time and evaluated (e.g., compared to) based on specified conditions to determine whether the actual value meets the conditions specified for the parameter. Additionally, such conditions must be maintained for a specified time period (e.g., denoting a wait time or stasis time indicating the required starting state conditions have been maintained for at least a minimum amount of time).

At step 808, a determination is made as to whether all parameters for all selected data channels simultaneously meet specified conditions for the continuous amount of time of the specified stasis times (which may alternatively be expressed as a specified number of column volumes). If step 808 evaluates to yes, control proceeds to step 810 where a determination is made that the starting state has been achieved. In the example described above with 3 parameters X1, X2 and X3 related to the LC and not the detector(s), the starting state may be further characterized as denoting equilibration of the LC. If step 808 evaluates to no, control proceeds to step 806 to continue automated monitoring. Note that for step 808 to evaluate to yes/true, all parameters of the starting state criteria defining equilibrium need to simultaneously meet associated parameter conditions and also continuously meet such conditions for their respective specified time periods. If even one of the parameters fails to meet and hold its associated condition(s) for the specified continuous amount of time (denoted by the stasis or wait time), the measured amount of time (that must equal the stasis or wait time to achieve equilibrium) is reset. Thus, all parameters may be characterized as meeting and holding their associated conditions for respective specified time periods simultaneously whereby all such respective time periods, during which such conditions are met, overlap. For example, criteria may indicate that parameter P1 must meet condition C1 for time period T1 and that parameter P2 must meet condition C2 for time period T2. Processing herein may determine the system as equilibrated when P1 meets condition C1 for time period T1 and, simultaneously, P2 meets condition C2 for time period T2 (e.g., where T1 and T2 overlap). For each of the parameters, an amount of elapsed time may be measured from a starting point when the parameter first meets its associated condition. Equilibrium starting state is determined as achieved once the overlapping measured elapsed times (for all parameters meeting and holding their associated conditions) equal their respective specified time periods. If an individual parameter of the criteria fails to meet and hold its associated condition for the specified time period or defined stasis time, the elapsed time measurement for that individual parameter may be reset. Furthermore, such measured elapsed time for the individual parameter may be reset if the individual parameter fails to meet and hold its associated condition(s) for at least its defined stasis time and/or fails to meet and hold its associated condition(s) until all other parameters are also "ready" (i.e., also meet and hold associated conditions for specified stasis times). In this manner, the state of equilibration is achieved when all parameters simultaneously meet and hold their associated conditions for at least specified stasis times.

The steps of the flowchart 800 may be performed as part of processing in connection with a method in which the starting state defines the criteria required to be established in order to commence performing an experiment that analyzes a sample. The same starting state may be required to be re-established prior to analyzing each sample. Subsequently, a second different method may then be selected for execution where the second method has a different second set of criteria denoting a second starting state defines the criteria required to be established in order to commence performing an experiment that analyzes a sample. The same second starting state may be required to be re-established prior to analyzing each sample in the second method. Thus, techniques herein may be used to establish new starting states as well as re-establish a starting state between experimental runs analyzing samples.

Consistent with other discussion herein, steps of the flowchart 800 may be combined with one or more additional steps, such as, for example, low pass filtering of acquired data points, performing pattern matching or recognition, performing additional processing for values in connection with other aspects of system health, and the like.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of performing experiments on samples comprising:
   receiving first criteria defining a first starting state for performing a first experiment in a system including one or more scientific instruments comprising a liquid chromatograph, wherein the first criteria includes sets of one or more conditions defining a state of equilibrium of the system;
   performing first processing that determines whether the first starting state is established in the system, the first processing performed until the first starting state is established in the system or an amount of elapsed time waiting to establish the first starting state exceeds a maximum amount of time, said first processing comprising:
      performing automated monitoring of a parameter for a selected data channel;
      determining whether the parameter meets specified conditions of the first criteria; and
      upon determining the first starting state is established in the system, transmitting a control signal to the system configured to place components of the system in a suitable operating state to allow the system to proceed with the first experiment that analyzes a first sample using the one or more scientific instruments of the system wherein the first criteria includes a first set of one or more conditions defining a state of equilibrium of the liquid chromatograph, wherein the one or more scientific instruments includes a detector coupled to the liquid chromatograph, and the first criteria includes a second set of one or more conditions defining any of a state of equilibrium and stability of the detector.

2. The method of claim 1, further comprising:
   selecting the data channel from a plurality of data channels, said plurality of data channels including at least a first data channel for the liquid chromatograph and a second data channel for another instrument of the system used in the first experiment;
   selecting, for the selected data channel, the parameter from a plurality of parameters; and
   specifying conditions denoting when the parameter for the selected data channel is in a state of equilibrium.

3. The method of claim 2, wherein the detector is an ultraviolet spectroscopic detector.

4. The method of claim 2, wherein the parameter for the selected data channel comprises a level parameter having an associated condition indicating that an actual value for the at least one selected data channel must meet a specified level target.

5. The method of claim 2, wherein the first data channel is column temperature.

6. The method of claim 2, wherein the second data channel is detector temperature.

7. The method of claim 1, wherein the first criteria comprises a plurality of parameters for a plurality of selected data channels, and wherein the first criteria comprises conditions indicating that actual values for the plurality of parameters must meet specified targets.

8. The method of claim 7, wherein the first criteria includes one or more time periods for which the actual values for the plurality of parameters must simultaneously meet specified targets in order to determine the first starting state is established in the system.

9. The method of claim 8, wherein each of the one or more time periods is expressed in units of time.

10. The method of claim 8, wherein the one or more time periods includes a plurality of time periods for the plurality of parameters whereby a different one of the plurality of time periods is specified for each of the plurality of parameters and denotes an individual stasis time for said each parameter.

11. The method of claim 1, further comprising:
    performing second processing that establishes the first starting state for a plurality of samples, wherein, for each of the plurality of samples, an experiment that analyzes said each sample using the one or more scientific instruments is not allowed to proceed until the first starting state has been established.

12. The method of claim 2, wherein the plurality of parameters include a composite parameter using data from two different selected data channels.

13. The method of claim 1, wherein the first criteria is included in a first method and the first method includes performing sample analysis on a first plurality of samples, and wherein the method includes:
    automatically ensuring that the first starting state is established in the system prior to proceeding with analysis of each of the first plurality of samples.

14. The method of claim 13, wherein a second method includes second criteria defining a second starting state and the second method includes performing sample analysis for a second plurality of samples, and wherein the method includes:
    automatically ensuring that the second starting state is established in the system prior to proceeding with analysis of each of the second plurality of samples.

15. The method of claim 1, wherein if the amount of elapsed time waiting to establish the first starting state exceeds a maximum amount of time, an error condition is determined and one or more responsive actions are taken.

* * * * *